(12) United States Patent
Baker et al.

(10) Patent No.: US 11,918,881 B2
(45) Date of Patent: Mar. 5, 2024

(54) SWIVEL MOUNT FOR DISPLAY OF EXERCISE MACHINE

(71) Applicant: BowFlex Inc., Vancouver, WA (US)

(72) Inventors: Bryce C. Baker, Vancouver, WA (US); Bryan W. Hamilton, Vancouver, WA (US); Edana French, Portland, OR (US)

(73) Assignee: BowFlex Inc., Vancouver, WA (US)

( * ) Notice: Subject to any disclaimer, the term of this patent is extended or adjusted under 35 U.S.C. 154(b) by 1 day.

(21) Appl. No.: 17/563,626

(22) Filed: Dec. 28, 2021

(65) Prior Publication Data

US 2022/0280856 A1 Sep. 8, 2022

Related U.S. Application Data

(60) Provisional application No. 63/245,739, filed on Sep. 17, 2021, provisional application No. 63/131,622, filed on Dec. 29, 2020.

(51) Int. Cl.
*F16M 11/00* (2006.01)
*A63B 71/06* (2006.01)
(Continued)

(52) U.S. Cl.
CPC ....... *A63B 71/0619* (2013.01); *F16M 11/105* (2013.01); *F16M 11/14* (2013.01);
(Continued)

(58) Field of Classification Search
CPC ........ A63B 71/0619; A63B 2071/0658; A63B 2225/09; A63B 21/225; A63B 2022/0676;
(Continued)

(56) References Cited

U.S. PATENT DOCUMENTS 2,972,496 A * 2/1961 Herbenar ............ F16C 11/0604
403/126
5,496,125 A * 3/1996 Maughan ............ F16C 11/0638
403/136
(Continued)

FOREIGN PATENT DOCUMENTS

EP 2063138 A1 5/2009
JP H10274235 A 10/1998
WO 2022/147012 A1 7/2022

OTHER PUBLICATIONS

U.S. Appl. No. 17/066,485, filed Oct. 8, 2021.
"International Search Report and Written Opinion for PCT/US2021/065347, dated Apr. 13, 2022."

*Primary Examiner* — Amy J. Sterling
(74) *Attorney, Agent, or Firm* — Dorsey & Whitney LLP

(57) ABSTRACT

Described herein is a swivel mount for rotatably coupling a display to the frame of an exercise machine. The swivel mount includes a rigid arm fixed to one of the display or the terminal end of a frame member, the arm terminating with a ball at its free end. A socket is defined at the other one of the display or frame member which rotatably received the ball. A rotational resistance mechanism is operatively associated with the socket to selectively engage the ball and resist the rotation of the swivel mount. In some embodiments, the arm of the swivel mount may rotate in a conical range of motion for repositioning the display in relation to the frame while the display remains in a fixed position relative to the arm.

26 Claims, 27 Drawing Sheets

(51) Int. Cl.
*F16M 11/10* (2006.01)
*F16M 11/14* (2006.01)
*F16M 11/20* (2006.01)
*F16M 13/02* (2006.01)

(52) U.S. Cl.
CPC ........ *F16M 11/2078* (2013.01); *F16M 13/02* (2013.01); *A63B 2071/0658* (2013.01); *A63B 2225/09* (2013.01); *F16M 2200/022* (2013.01); *F16M 2200/024* (2013.01)

(58) Field of Classification Search
CPC .............. A63B 21/4047; A63B 22/001; A63B 22/0015; A63B 22/0605; A63B 22/0664; A63B 22/203; F16M 11/105; F16M 11/14; F16M 11/2078; F16M 13/02; F16M 2200/022; F16M 2200/024
See application file for complete search history.

(56) References Cited

U.S. PATENT DOCUMENTS

| | | | |
|---|---|---|---|
| 9,765,811 B2* | 9/2017 | Karpman | F16C 11/0609 |
| 10,702,736 B2 | 7/2020 | Weston et al. | |
| 10,954,995 B2* | 3/2021 | Sugg | F16C 11/0623 |
| 11,137,019 B2* | 10/2021 | Rousseau | G09B 9/00 |
| 2003/0042385 A1 | 3/2003 | Hung et al. | |
| 2009/0166482 A1 | 7/2009 | Gan et al. | |
| 2014/0138507 A1* | 5/2014 | Hennessey | F16M 11/14 248/276.1 |
| 2020/0309312 A1* | 10/2020 | Ye | F16M 11/14 |
| 2020/0408244 A1* | 12/2020 | Yurman | F16M 11/2078 |
| 2022/0280856 A1* | 9/2022 | Baker | F16M 13/02 |
| 2023/0055544 A1* | 2/2023 | Sloterbeek | B60R 1/04 |
| 2023/0059408 A1* | 2/2023 | Parab | F16M 13/022 |

* cited by examiner

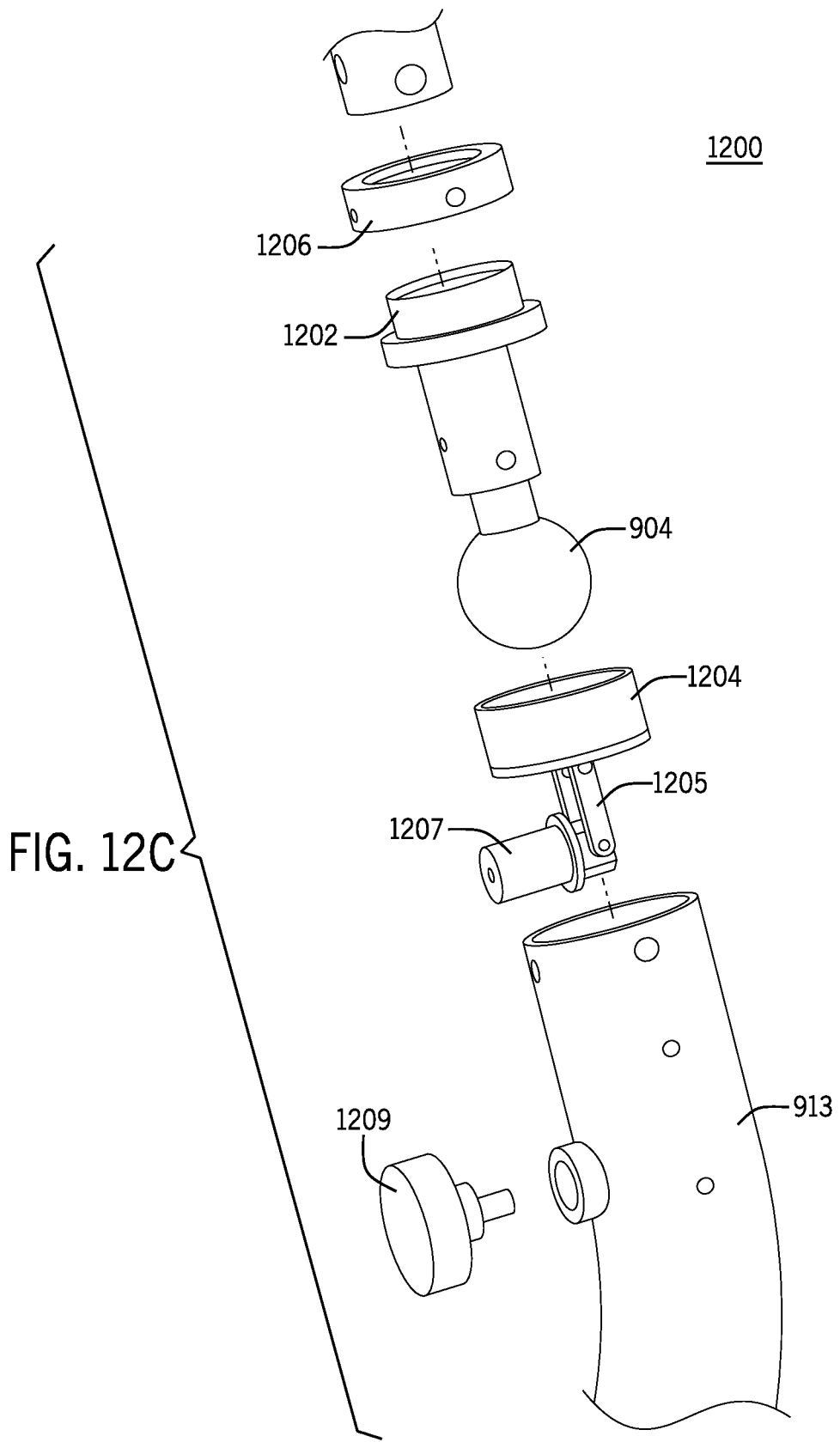

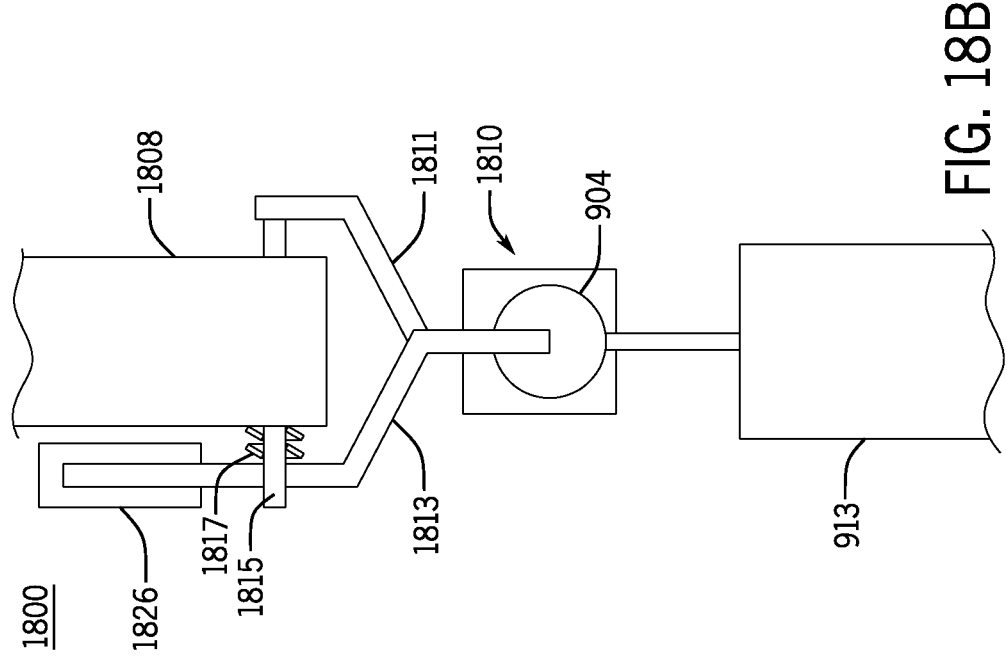
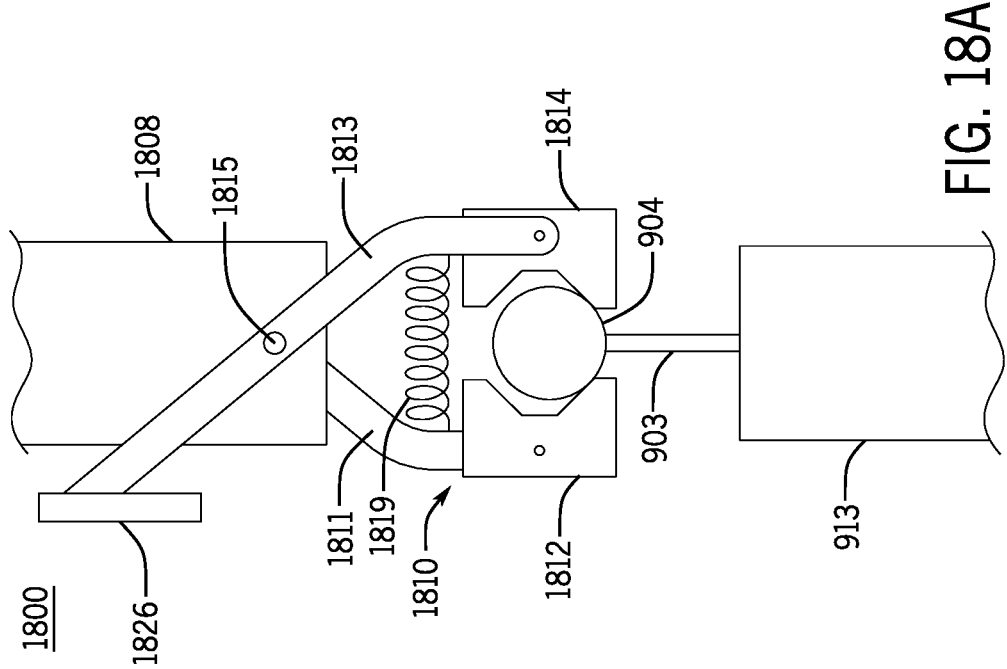
FIG. 18A
FIG. 18B

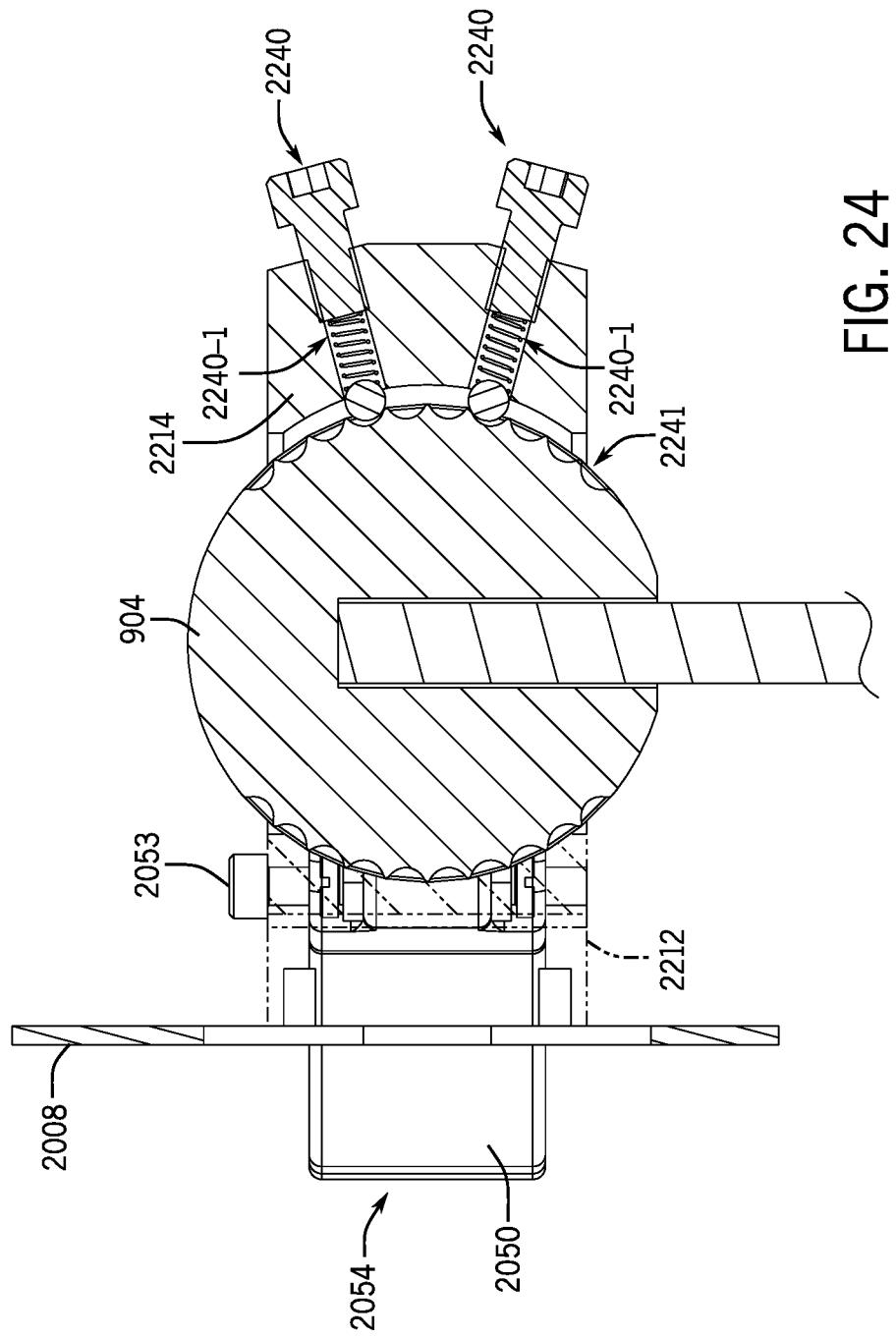

SWIVEL MOUNT FOR DISPLAY OF EXERCISE MACHINE

CROSS-REFERENCE TO RELATED APPLICATION(S)

This application claims priority to U.S. Application No. 63/245,739 filed Sep. 17, 2021, and U.S. Application No. 63/131,622 filed Dec. 29, 2020, which are incorporated herein by reference, in their entirety, for any purpose.

TECHNICAL FIELD

The present disclosure relates generally to stationary exercise machines and more specifically to swivel mounts for rotatably coupling a display to the frame of the exercise machine.

BACKGROUND

Various types of exercise machines exist to aid the user in performing physical exercise for example, for maintaining physical fitness. Often the exercise machine may include a console and/or a display, which may be part of the console or a separate unit. Displays are often provided on exercise machine for displaying information to the user, such as an exercise program, exercise performance data, and content (e.g., entertainment and/or instructional videos). A display may thus enhance the user experience. Displays are mounted in a suitable position and facing a suitable orientation for viewing while the user is using the machine to exercise. Typically a display is mounted at the front of the machine, and may sometimes incorporated into the console. In further efforts to enhance the utility, aesthetics and user satisfaction with exercise machines, designers and manufacturers continue to seek improvements thereto.

SUMMARY

The present disclosure relates generally to stationary exercise machines and more specifically to a swivel mount rotatably coupling a display/console or media cradle to the frame of the exercise machine.

According to some embodiments, a display mount assembly of an exercise machine having a display and a base that supports the exercise machine in a stationary position relative to a support surface includes a frame member extending above the base of the exercise machine. The display mount further includes a rigid arm having a first end and a second end, wherein a ball is fixed to the rigid arm at one of the first and second ends of the rigid arm, wherein the other one of the first and second ends of the rigid arm is fixed to one of a terminal end of the frame member or to a rear side of the display, wherein the other one of the terminal end of the frame member or the rear side of the display defines a socket configured to rotatably receive the ball, and a rotational resistance mechanism operatively associated with the socket to selectively, responsive to manipulation by the user, resist the relative rotation of the ball in the socket.

A display mount assembly according to further embodiments may include a frame member extending above the base of the exercise machine, a cavity in an upper terminal end of the frame member, a rigid arm rotatably received in the cavity, and a retention member restricting axial movement of the rigid arm. In embodiments herein, the rigid arm is configured to be rigidly coupled, at its first end, to a rear side of a display such that the display remains in a fixed position in relation to the rigid arm when coupled to the rigid arm, and the rigid arm includes a ball at its second end, the ball being rotatably received in the cavity. The retention member is operatively associated with the upper terminal end and positioned across the cavity to substantially prevent movement of the ball along a length of the frame member while allowing the ball to rotate in multiple directions in the cavity.

In accordance with further embodiments herein, an exercise machine may include a display enclosed at least partially by a housing, a frame including a base that supports the exercise machine in a stationary position relative to a support surface and a frame member extending above the base, and a display mount rotatably coupling the housing to the frame member. The display mount may include a rigid arm having a first end and a second end, with the first end being fixed to the housing and the second end being rotatably coupled to a terminal end of the frame member to form a ball joint therewith, whereby the display is repositionable relative to the frame member in response to rotation of the ball joint while the display remains in a fixed position relative to the rigid arm. The rigid arm of the display mount may be substantially straight, or it may include one or more curved portions.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The description will be more fully understood with reference to the following figures in which components may not be drawn to scale, which are presented as various embodiments of the exercise machine described herein and should not be construed as a complete depiction of the scope of the exercise machine.

FIG. 12C shows a partially exploded view of the display swivel mount in FIGS. 12A and 12B.

FIGS. 18A and 18B show two orthogonal views of a display swivel mount according to further embodiments of the present disclosure.

FIG. 24 shows a side section view of the display swivel mount in FIG. 22.

DETAILED DESCRIPTION

Described herein are embodiments (see FIGS. 1-4) of a swivel mount for rotatably coupling a display to the frame of an exercise machine. A typical stationary exercise machine includes one or more movable components, such as rotating pedals, reciprocating foot and/or arm linkages and the like, that are supported on a stationary frame. The movable components are operatively arranged to facilitate physical exertion by the user. A stationary exercise machines may be equipped with at least one display, which may be part of the console (e.g., integrated with a housing of the console) of the machine or it may be separate or separable therefrom. In some embodiments, a display may be permanently mounted a distance away from the console, the term permanently (or non-separable) generally implying that the display is not intended for removal by the user for normal use other than for repair or replacement. Additionally or alternatively, the exercise machine may be equipped with a media cradle configured for temporarily but securely mounting an electronic/media device with a display (e.g., the user's smart phone or table) to the exercise machine. For example, FIGS. 5-7 each show a different exercise machine which may include a swivel mount according to the present disclosure.

Figure 5:
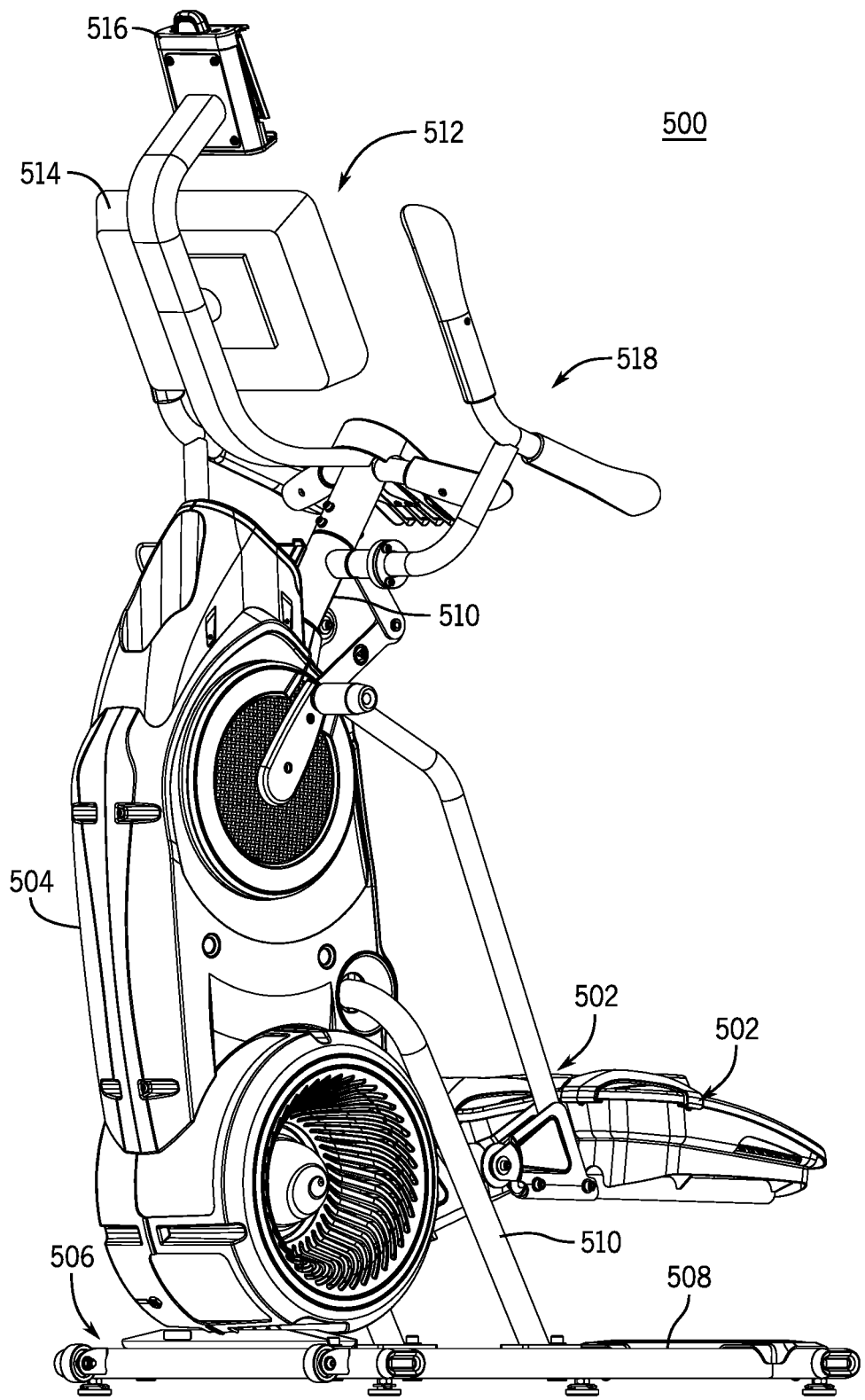
FIG. 5 shows an exercise machine with a console and a media cradle that may incorporate a swivel mount according to the present disclosure.

FIG. 5 shows a stationary exercise machine 500 that enables the user to engage in physical exertion through a blend of elliptical and stepper or climber motion. The exercise machine 500 includes a set of pedals 502 that support the user during exercise. The pedals 502 may be connected via a set of movable members (e.g., linkages, crank arms, etc.) to a resistance mechanism, which may be at least partially, and in some cases substantially fully, enclosed within a shroud 504. The pedals 502 cooperate with the resistance mechanism (e.g., a magnetically- or frictionally-resisted flywheel, an air-based resistance such as fan, any other suitable type of resistance mechanism, or any combinations thereof) to resist the movement of the pedals 502 when driven by the user. A stationary frame 506 that includes a base 508 and an upright frame 510 supports the moving components (e.g., pedals, linkages, crank arms, flywheel, etc.) of the exercise machine 500. The frame 506 also supports a console 512 with a display enclosed by housing 514, and may additionally or alternatively support a media cradle 516 for removably mounting an electronic media device that has a display (e.g., a smartphone or tablet). The console 512 (e.g., housing 514) and/or the media cradle 516 may be rotatably mounted to the frame 506 with a swivel mount according to the present disclosure to enable repositioning the display in relation to the stationary frame 506. The exercise machine 500 may include one or more handles 518, for example one or more moving handles designed to be grasped by the user and which reciprocate as the user uses the machine and/or one or more stationary handles, such as support grips and/or a handlebar for supporting the user's hands and/or a portion of the user's upper body while using the machine. In some embodiments, the console and/or cradle are mounted so as to position the display in proximity to the handle(s).

Figure 6:
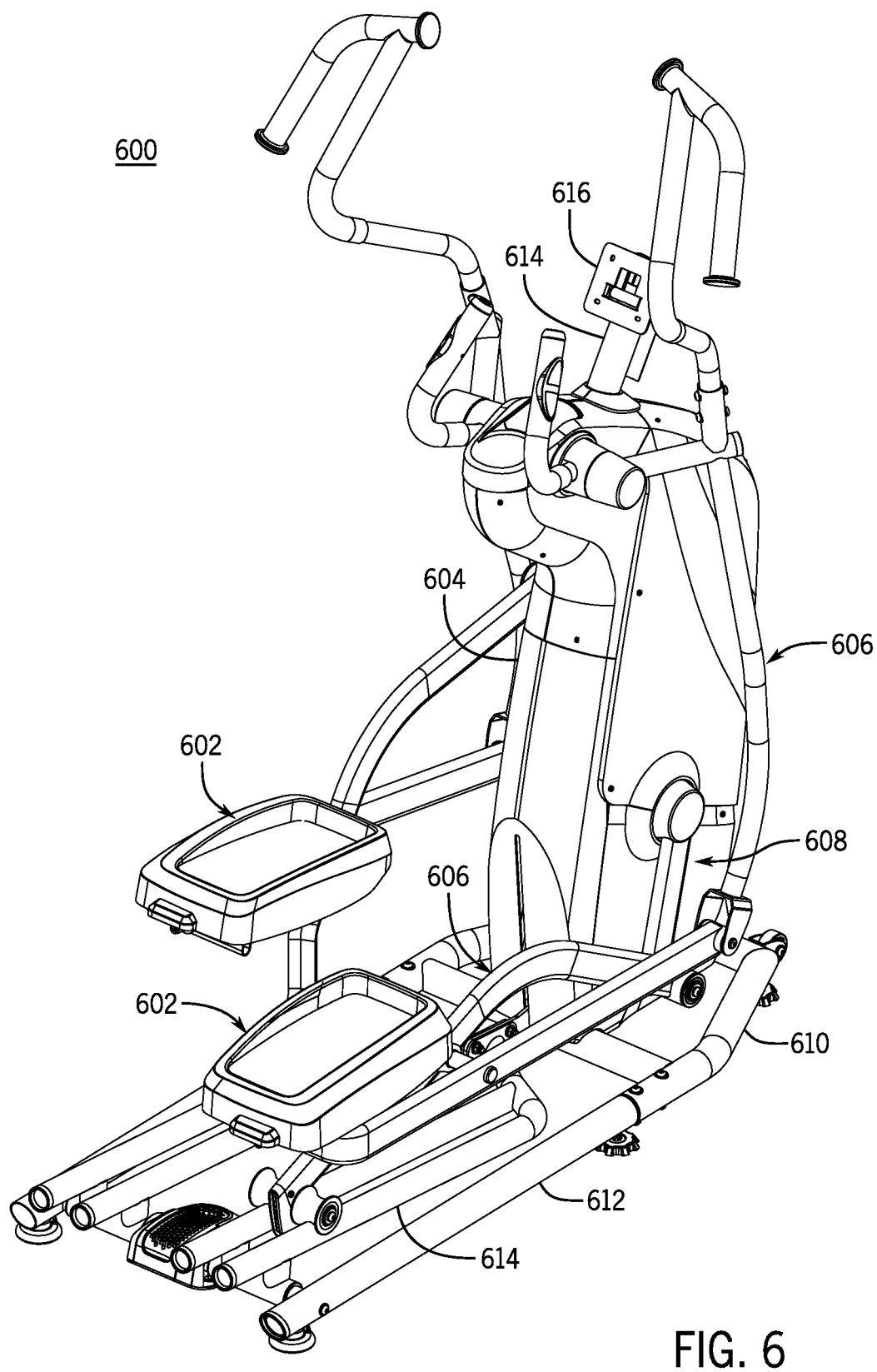
FIG. 6 shows an elliptical machine that may include a display/console and/or a media cradle rotatably mounted to the frame via a swivel mount according to the present disclosure.

FIG. 6 shows another example of a stationary exercise machine 600, namely a front-drive elliptical machine, which may include a display (not shown) and/or a media cradle (not shown) rotatably mounted to the frame 610 via a swivel mount according to the present disclosure. The elliptical machine 600 of FIG. 6 includes a set of pedals 602, supported by a frame 610, and constrained to move in a generally elliptical path. The pedals 602 are connected via a set of movable members (e.g., linkages 606, crank arms 608, etc.) to a resistance mechanism, which may be at least partially, and in some cases substantially fully, enclosed within a shroud 604. The pedals 602 cooperate with the resistance mechanism (e.g., a magnetically- or frictionally-resisted flywheel, a fan, or another type of resistance mechanism, or combinations thereof) to resist the movement of the pedals 602 when driven by the user. A configuration of the elliptical machine 600 may be adjustable, such as by adjusting an incline of a rail 614 supporting the pedals 602, which may change an exercise characteristic (e.g., an incline path of the pedals) of the elliptical machine 600. Like the exercise machine 500, the frame 610 of the elliptical machine 600 may support a console (not shown) and/or a media cradle (not shown), which may be mounted to the upright frame 614 via console mount 616. In some embodiments, a swivel mount according to the present disclosure may be incorporated in or replace the console mount 616. The display, whether part of a console integrated with the exercise machine or part of a removable electronic device, may thus be movably (e.g., rotatably) secured on the exercise machine (e.g., elliptical machine 600).

Figure 7:
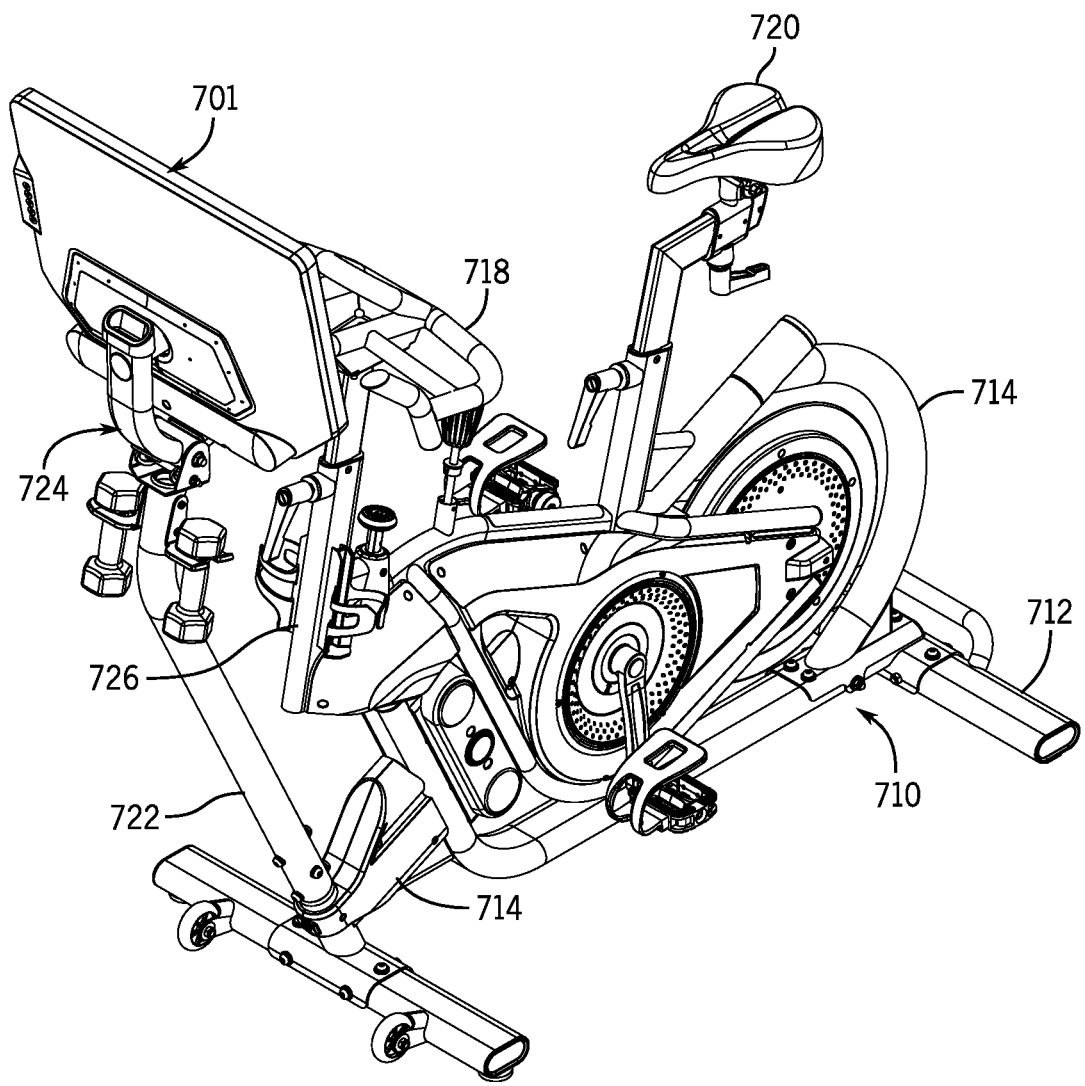
FIG. 7 shows an exercise bike with a display that may be rotatably mounted to the bike frame via a swivel mount according to the present disclosure.
Figure 8:
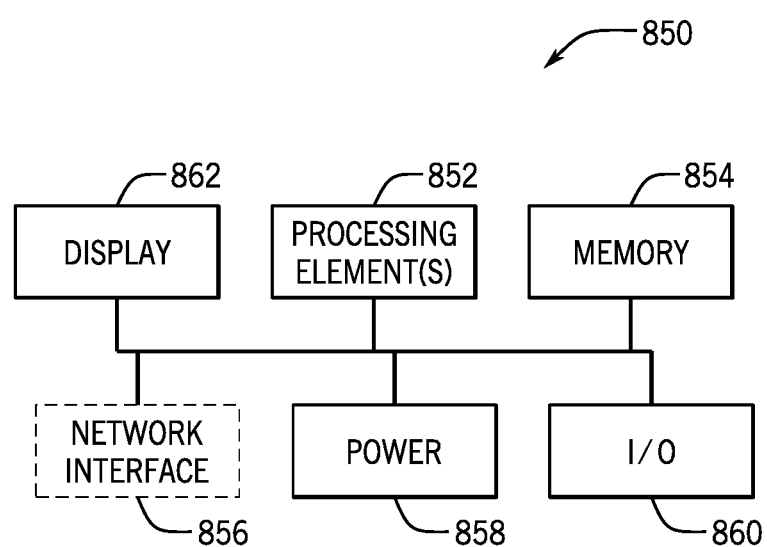
FIG. 8 shows a block diagram of a console in accordance with some embodiments of an exercise machine according to the present disclosure.

FIG. 7 shows yet another example of a stationary exercise machine, namely an exercise bike 700, which may include a display 701 and/or a media cradle (not shown) rotatably mounted to the frame 710 via a swivel mount according to the present disclosure. The swivel mount according to the present disclosure may replace the display mount 724 shown in FIG. 7. The bike 700 of the present example includes set of rotating bike pedals 702 and a resistance mechanism (e.g., a flywheel 703 with a magnetic or friction brake) operatively coupled to the pedals 702 to resist (via the braking force applied by the brake) the rotation of the pedals 702. The pedals 702 and the resistance mechanism are supported by the frame 710 which includes a base 712 and an upright frame 712 that supports the moving components of the bike. As shown, a handlebar 718 and a seat 720 are supported by the frame 710. A display 701 (e.g., a passive or touch-sensitive display), which may additionally and optionally provide functions of a control console, may be mounted to the frame 710, in this example via a display mast 722 extending from the base 712. The display 701 is mounted to the display mast via a display mount 724. In some embodiments, a swivel mount according to the present disclosure may be integrated with or replace the display mount 724. The bike 700 may include additional displays, such as a display removably securable to the frame via a cradle (not shown). Any of the displays may be mounted to the bike 700 using one or more swivel mounts according to the present disclosure, and which may be supported at different locations on the bike, such as by or near the handlebar support 726. To accommodate users of different sizes/statures and/or multiple uses of the display, it may be advantageous for the display to be adjustably mounted on the exercise machine such as to enable repositioning of the display in relation to the fixed frame of the exercise machine. Some embodiments of the swivel mount for adjustably mounting a display to an exercise machine are now shown and described, referring back to FIGS. 1-4.

Figure 1:
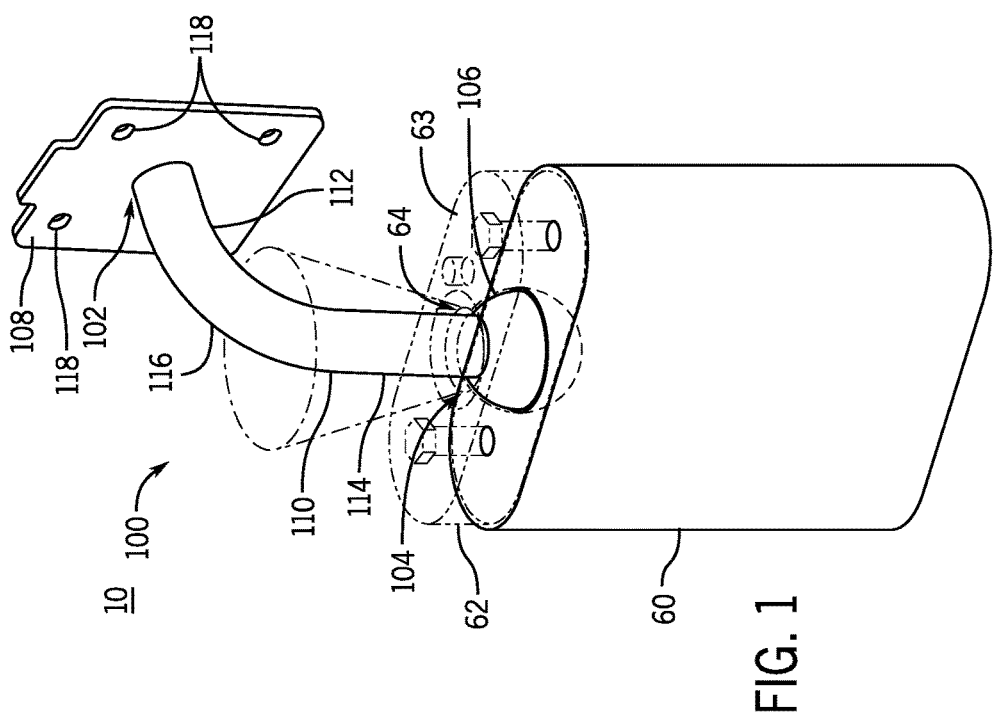
FIG. 1 shows a swivel mount for a display/console or media cradle of an exercise machine according to the present disclosure.

FIG. 1 shows an embodiment of a swivel mount 10 according to the present disclosure. The swivel mount 10 is configured to rotatably couple a display (not shown) to the frame of an exercise machine. The swivel mount 10 includes a rigid arm 100 rotatably secured to a frame member 60 of the exercise machine (e.g., any of the exercise machines 500, 600, or 700). The rigid arm 100 has a first end 102 configured to be mounted so as to remain in a fixed position relative to the display. In some embodiments, the first end 102 is fixed to the rear side of an enclosure that at least partially surrounds or encloses the display. In some embodiments, a mounting plate 108 is fixed (e.g., integrally formed with or rigidly coupled, such as by welding, fusing, bolting, riveting or otherwise fastening) to the rigid arm 100, at its firs end 102. The mounting plate 108 is configured to be bolted or otherwise fastened (e.g., via faster holes 118) to the rear side of the display housing (not shown in FIG. 1) thus fixedly coupling the first end 102 of the rigid arm 100 to the display. In some embodiments, the mounting plate 108 may be integrally formed with the rear side of the display housing.

The second end 104 of the rigid arm 100 is rotatably coupled to frame member 60. In some embodiments, the second end 104 forms a ball joint with the terminal end of the frame member 60. In the example in FIG. 1, a spherically- or ball-shaped body 106 (also referred to simply as ball 106) is provided at the second end 104 and the ball 106 is rotatably received in a cavity formed in the terminal end of the frame member 60. The second end 104 of the rigid arm 100 may thus also be referred to as the ball end of the rigid arm 100. The arm 100 is implemented by an elongate rigid member, in this example shown as a substantially cylindrical rod 110. In some embodiments, the elongate member may be substantially hollow and may be referred to as a tube. The rod or tube need not have circular cross-section as in the illustrated example, but may instead be rectangular, octagonal or have a different cross-sectional geometry. The rigid arm 100 (e.g., rod 110) may be substantially straight in some embodiments. In other embodiments, as shown in FIG. 1 for example, the rigid arm 100 is bent in the lengthwise direction. The rigid arm may include at least one curve, in some cases multiple curves, along its length between the first and second ends. In the example in FIG. 1, a first end portion 112 of the rod 110 extends from (e.g., perpendicularly to) the rear side of the mounting plate 108. The rod's second end portion 114, which is joined to the ball 106, is arranged at an angle to the first end portion 112, in this case substantially perpendicularly thereto. The first end portion 112 is rigidly joined to the second end portion 114 by an intermediate, curved portion 116. In other embodiments, intermediate portion 116 may define a sharper bend and/or form an apex where the first and second straight end portions meet. In yet other examples, the arm 100 may have a different contour along its lengthwise direction, for example including multiple bent/curved portion, which may bend the rod out of plane.

The ball 106 is received in a cavity formed in the terminal end of the frame member 60. In this example, the ball 106, and thus the arm 100, is retained in the cavity by a clamp or retention member, shown here as retention block 62. The cavity may have any suitable shape (e.g., a hemispherical shape) to accommodate the ball 106 at least partially therein (e.g., accommodating a lower portion of the ball 106). The retention block 62 has a first side that faces the frame member 60 and a second, opposite side 63 facing the first end 102 of the arm 100. The retention block 62 defines a through aperture 64 of variable diameter that connects the first side to the second side. The diameter of the through aperture 64 at the first side is sufficiently wide to accommodate the upper portion of the ball 106. In some embodiments, the diameter of the through aperture 64 may vary so as to define a substantially hemispherical cavity that fits over the upper portion of the ball. The diameter of the through aperture 64 at the second side is smaller than the diameter of the ball 106 so as to retain the ball in the cavity, but larger than the width of the second end 104 of the rod 110. The arm 100 is thus rotatably mounted to the frame member 60 in a manner that allows the arm 100, and thus its lower portion, to rotate substantially freely in two planes at the same time, whereby the lower portion of the arm 100 is rotatable to any position within a frustoconical envelope extending above the aperture 94. The ball joint allows for a multi-directional rotational motion at the ball-end of the rod, allowing the rod to rotate through a conical range of motion. The diameter of the aperture 94 on the second face 63 of the retention block 62 may be selected so as to limit the width of the conical range of rotational motion of the rod 110 (e.g., the wider the diameter the wider the cone of rotation, and vice versa). The swivel mount 10 thus enables the arm 100 and consequently the display fixed to the arm to be repositioned in relation to the frame member of the exercise machine to any desired position within rotational envelope as a result of the multi-directional rotation of the ball 106 within the cavity of the frame member 60. Any suitable mechanism, such as friction, a set screw, or the like, may be used to restrict or prevent rotation of the ball 106, and consequently movement of the arm at certain times, such as after adjusting the display to a new position/orientation and during exercise. For example, the exterior of the ball 106 and/or the interior walls of the cavity may be configured to provide sufficient frictional resistance to rotation of the ball 106 therein such that a force larger than the weight of the display mounted is needed to move the arm of the swivel mount. In other examples, a set screw or similar pressing or clamping mechanism may selectively apply a force against the ball 106 to reduce or prevent its undesired movement relative to the cavity, thereby fixing the swivel mount in a desired position/orientation. It should be noted that in other examples, the location of the ball 106 and cavity may be reversed. In other words, the ball of the ball-and-socket joint may be fixed to the terminal end of the frame member 60, and the cavity (or socket) may be formed at the lower, terminal end of the arm 100.

Figure 2:
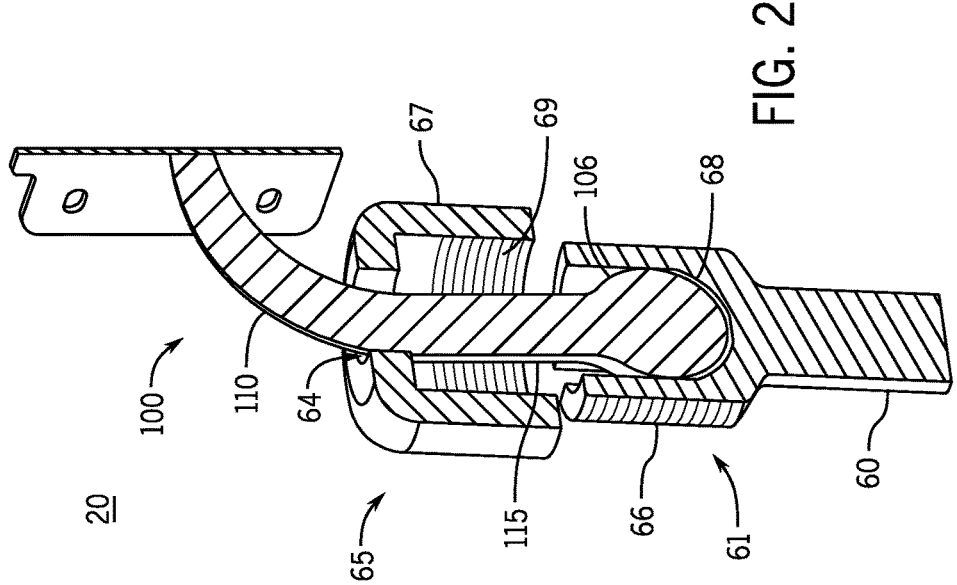
FIG. 2 shows another embodiment of a swivel mount for a display/console or media cradle of an exercise machine according to the present disclosure.

FIG. 2 shows another embodiment of a swivel mount 200 according to the present disclosure. Similar to the example in FIG. 1, swivel mount 200 includes an arm 100 that terminates with a ball-shaped body 106 at one end, and which is configured to be fixed, at its opposite end, to the rear side of a display (e.g., via a mounting structure). The arm 100 is similarly rotatably received by a frame member 60 (e.g., a mast, a front upright support, a handlebar, etc.) of the exercise machine. In the present example, however, the retention member 65 is implemented by a cap 67 threadedly coupled to the terminal end 61 of the frame member 60. The terminal end 61 of frame member is shaped as a cup, defining a cavity 68 that rotatably accommodate the ball 108 therein. The open top side of the cup is at least partially enclosed by the cap 67 when the cap 67 is operatively joined to the frame member 60. In this example, the cap 67, which includes first thread 69 on an inwardly facing surface thereof, is sized to fit over the terminal end 61 of the frame member 60 and engage a cooperating, second thread 66 on an outwardly facing surface of the terminal end 61, for coupling the retention member 65 to the frame member 60. The cap 67 defines a through passage 64 having a diameter that is smaller than the diameter of the ball 106 but larger than the diameter of the lower portion of the arm, also referred to as shaft 115, thereby allowing the shaft 115 to rotate substantially freely in two planes in a range of motion that sweeps a conical path. In the examples in FIGS. 1 and 2, the ball 106 is retained in the cavity (e.g., cavity 68) by a retention member positioned vertically above the cavity, that is above the terminal end 61, and thus vertically above the ball 106. In other examples, the ball 106 may be retained in the cavity in the terminal end 61 by a retention member positioned vertically below the ball 106, as shown for example in FIGS. 3 and 4.

Figure 3:
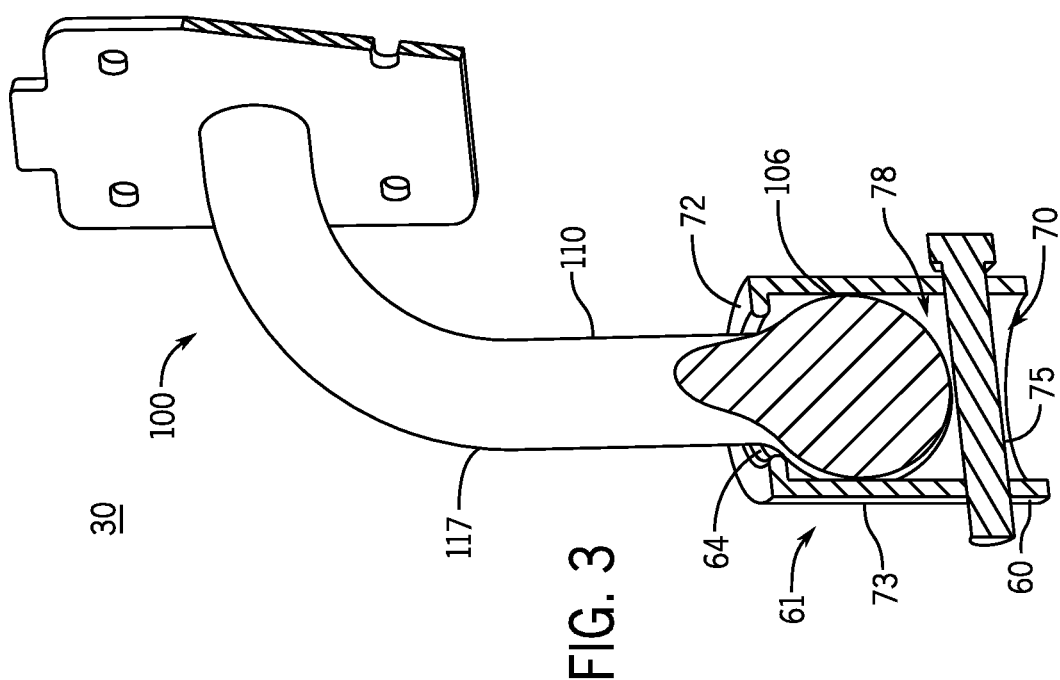
FIG. 3 shows yet another embodiment of a swivel mount for a display/console or media cradle of an exercise machine according to the present disclosure.

The swivel mount 30 in FIG. 3 has an arm 100 implemented by a curved rod 110 configured to be fixed, at one end, to the back of a display housing (e.g., a display enclosure or cradle removably supporting a display). The rod 110 has a ball 106 at its opposite, lower end. The rod 110 has a bend 117 at an intermediate location between the first and second opposite ends of the rod. In other examples, the rod 110 may have two or more bends, which, in some cases, may have a concave sides facing in opposite direction (e.g., a generally S-shaped rod). In yet other examples, the rod 110 may be substantially straight. In the present example, the terminal end 61 of frame member 60 defines a cavity 78 configured to accommodate the ball 106 of the arm 100. For example, the frame member 60, or at least an upper portion thereof, may be implemented by a tube and the cavity 78 is defined by the interior walls of the tube. A ledge 72 extends radially inward from the top side of the tube 73 to define a through aperture 64 having a diameter which is smaller than the diameter of the ball 106 but larger than the diameter of the shaft 115 to allow the shaft 115 to swivel relative to the terminal end 61 in a substantially conical range of motion. In the present example, the base of the cavity 78 is defined by the retention member 70, positioned below the ball 106 and shown here as a transverse support 75 (e.g., a plate or pin) extending through the thickness of the frame member 60. The retention member 70, in combination with the ledge 72, restricts or substantially prevents translation of the arm 100 (e.g., shaft 115) in the axial direction (i.e. lengthwise, along the length of the tube) while allowing the arm 100 (e.g., shaft 115) to rotate freely in a conical range of motion. As in the prior examples, the display when fixed to the arm 100 of the mount 30 does not move in relation to the arm 100 but is able to be repositioned and/or rotated to any positions/orientation permitted by the conical range of motion of the shaft 115

Figure 4:
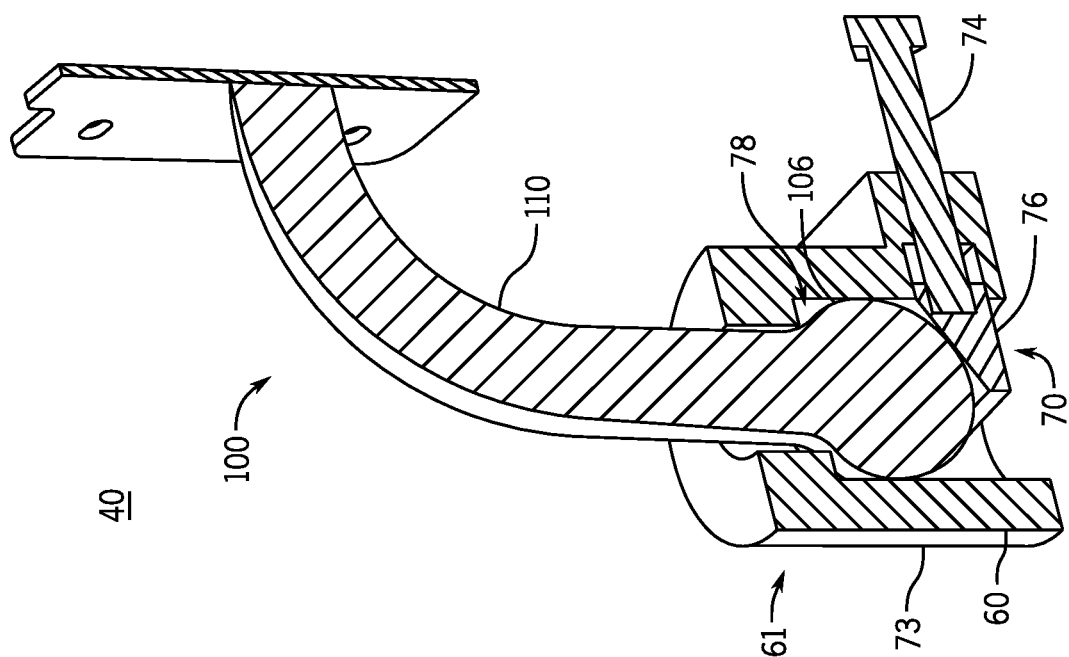
FIG. 4 shows a further embodiment of a swivel mount for a display/console or media cradle of an exercise machine according to the present disclosure.

FIG. 4 shows another embodiment of a swivel mount assembly implemented, in part, by a capped tubular terminus at the upper end of the frame member and a rigid arm rotatably mounted thereto. The swivel mount 40 includes a rigid arm 100 (e.g., curved rod 110) having a ball 106 at its lower end. As previously described, in other embodiments the location of the ball and socket may be reversed, for example by fixing the ball on the terminal end 61 of the frame member 60 and fixing a cup-shaped structure to the lower end of the rigid arm 100. In FIG. 4, the terminal end 61 of the frame member 60 is similarly configured to define a cavity 78, the top side of which is at least partially enclosed to prevent movement of the ball 106 in the upward, axial direction. The ball 106 is retained in the cavity 78 by retention member 70, which in this example is implemented by a pin 74 extending transversely to frame member 60 toward the interior of tube 73 and terminating with a wedge 76. The wedge 76 has a ramped upper side, facing the ball 106 and which engages the underside of the ball 106 to prevent the ball 106 from moving in the downward axial direction. The wedge 76 additionally can be used to exert an adjustable amount of force, depending on the lateral position of the wedge within the tube, to the underside of the ball 106, which can be used to selectively and substantially immobilize the ball in a particular rotational position, when desired such as, after having adjusted the swivel mount to a new desired position). Resistance to the rotational of the ball 106 within the cavity 78 may additionally or alternatively be provided via other means, such as an additional set screw, friction-increasing features or coatings on the bearing faces of the swivel joint. The swivel mount according to the present disclosure may be used for mounting a display (e.g., which may be integrated in a console or separate therefrom) to virtually any type of exercise machine such as, but not limited to, a cable machine, a rower, a treadmill, or any of the examples shown in FIGS. 5-7.

An exercise machine according to any embodiments of the present disclosure may include a console 850 for controlling one or more operations of the exercise machine, and which may be coupled to the frame of the exercise machine in accordance with any of the examples herein. In some embodiments, the console 850 may be operable to display content and/or facilitate interaction with the user while the user is exercising. The console 850 may be supported by the frame, such as by an upright support member or mast extending from and/or above the base of the frame. The support structure supporting the console 850 may position the console 850 in a convenient location, such as at a location whereby controls of the console are accessible to the user while exercising with the exercise machine and/or the display is visible to the user during use of the exercise machine. In some embodiments, at least a portion of the console 850, such as the display, may be removably mounted to the support structure. In some embodiments, the console 850 and/or the console support structure may be configured to adjusting the vertical position, the horizontal position, and/or orientation of the console or a component thereof (e.g., the display) with respect to the rest of the frame.

FIG. 5 illustrates a block diagram of a console 850. As shown, the console 850 may include one or more processing elements (or simply processor) 852, memory 854, an optional network/communication interface 856, a power source 858, and one or more input/output (I/O) devices 860. As discussed, the console 850 may also include a display 862, which may implement display 180, or which may be a separate, additional display. For example, the display 862 of the console 850 may be a touch-sensitive display that functions as an input/output device, while display 180 may be a passive display, which in some cases may have a larger screen size than that of display 862, for providing content to the user while exercising. In other embodiments, both of the displays 180 and 862 may be either passive displays, or both may be touch sensitive. In yet other embodiments, the functionality of display 862 associated with console 850 may be provided by display 180. The various components of console 850 may be in direct or indirect communication with one another, such as via one or more system buses or other electrical connections, which may be wired or wireless.

The processor(s) 852 may be implemented by any suitable combination of one or more electronic devices (e.g., one or more CPUs, GPUs, FPGAs, etc., or combinations thereof) capable of processing, receiving, and/or transmitting instructions. For example, the processor(s) 852 may be implemented by a microprocessor, microcomputer, graphics processing unit, or the like. The processor(s) 852 may include one or more processing elements or modules that may or may not be in communication with one another. For example, a first processing element may control a first set of components of the console 850 and a second processing element may control a second set of components of the console 850 where the first and second processing elements may or may not be in communication with each other. The processor(s) 852 may be configured to execute one or more instructions in parallel locally, and/or across a network, such as through cloud computing resources or other networked electronic devices. The processor 852 may control various elements of the exercise machine, including but not limited to the display (e.g., display 862).

The display 862 provides an output mechanism for the console 850, such as to display visual information (e.g., images, videos and other multi-media, graphical user interfaces, notifications, exercise performance data, exercise programs and instructions, and the like) to a user, and in certain instances may also act to receive user input (e.g., via a touch screen or the like), thus also functioning as an input device of the console. The display 862 may be an LCD screen, plasma screen, LED screen, an organic LED screen, or the like. In some examples, more than one display screens may be used. The display 862 may include or be otherwise associated with an audio playback device (e.g., a speaker or an audio output connector) for providing audio data associated with any visual information provided on the display 862. In some embodiments, the audio data may instead be output via a Bluetooth or other suitable wireless connection.

The memory 854 stores electronic data that may be utilized by the console 850, such as audio files, video files, document files, programming instructions, media, buffered data such as for executing programs and/or streaming content, and the like. The memory 854 may be, for example, non-volatile storage, a magnetic storage medium (e.g., a hard disk), optical storage medium, magneto-optical storage medium, read only memory, random access memory, erasable programmable memory, flash memory, or a combination of one or more types of memory components. In some embodiments, memory 854 may store one or more programs, modules and data structures, or a subset or superset thereof. The program and modules of the memory 854 may include firmware and/or software, such as, but are not limited to, an operating system, a network communication module, a system initialization module, and/or a media player. The operating system may include procedures for handling various basic system services and for performing hardware dependent tasks. Further, a system initialization module may initialize other modules and data structures stored in the memory 854 for the appropriate operation of the console. In some embodiments, the memory 854 may store, responsive to the processor 852, exercise performance data (e.g., resistance level, tilt or incline data, cadence, power, user heart rate, etc.) obtained or derived from measurements by one or more sensors on the exercise machine. The memory 854 may store one or more exercise programs and instructions, which cause the processor 852 to adapt one or more of the exercise programs based on the exercise performance data. The memory 854 may store the adapted exercise program(s) and may subsequently cause the processor 852 to control an operation of the exercise machine in accordance with the adapted exercise program(s). For example, the processor 852 may provide instructions the user, e.g., via the display or other component of the console, for adjusting the configuration of the exercise machine (e.g., resistance level, adjusting incline, enabling or disabling tilt, etc.) or the user's performance (e.g., increasing or decreasing cadence or other parameter that measures user exertion) in accordance with the adapted exercise program. In some embodiments, the processor 852 may automatically, concurrently with or alternatively to providing instructions, adjust the configuration of the exercise machine in accordance with the adapted exercise program.

The network/communication interface 856, when provided, enables the console 850 to transmit and receive data, to other electronic devices directly and/or via a network. The network/communication interface 856 may include one or more wireless communication devices (e.g., Wi-Fi, Bluetooth or other wireless transmitters/receivers, also referred to as transceivers). In some embodiments, the network/communication interface may include a network communication module stored in the memory 854, such as an application program interface (API) that interfaces and translates requests across the network between the network interface 856 and other devices on the network. The network communication module may be used for connecting the console 850, via the network interface 856, to other devices (such as personal computers, laptops, smartphones, and the like) in communication with one or more communication networks (wired or wireless), such as the Internet, other wide area networks, local area networks, metropolitan area networks, personal area networks, and so on.

The console 850 may also include and/or be operatively associated a power supply 858. The power supply 858 provides power to the console 850. The power supply 858 may include one or more rechargeable batteries, power management circuit(s) and/or other circuitry (e.g., AC/DC inverter, DC/DC converter, or the like) for connecting the console 850 to an external power source. Additionally, the power supply 858 may include one or more types of connectors or components that provide different types of power to the console 850. In some embodiments, the power supply 858 may include a connector (such as a universal serial bus) that provides power to the an external device such as a smart phone, tablet or other user device.

The one or more input/output (I/O) devices 860 allow the console 850 to receive input and provide output (e.g., from and to the user). For example, the input/output devices 860 may include a capacitive touch screen (e.g., a touch screen associated with display 862), various buttons, knobs, dials, keyboard, stylus, or any other suitable user controls. In some embodiments, inputs may be provided to the console (e.g., to processor 852) also via one or more biometric sensors (e.g., a heart rate sensor, a fingerprint sensor), which may be suitably arranged on the exercise machine, such as by placing them at one or more locations likely to be touched by the user during exercise (e.g., on a handle or handlebar of the exercise machine). The input/output devices 860 may include an audio input (e.g., a microphone or a microphone jack). In some embodiments, the processor 858 may be configured to receive user inputs (e.g., a voice commend) via the audio input. One or more of the input/output devices 860 may be integrated with or otherwise co-located on the console. For example, certain buttons, knobs and/or dials, may be co-located with the display 862, which may be a passive or touch sensitive display, and enclosed by a console housing. In some examples, one or more of the input devices (e.g., button for controlling volume or other functions of the console) may be located elsewhere on the exercise machine, e.g., separately from the display 862. For example, one or more buttons may be located on the handlebar and/or a portion of the frame. One or more input devices (e.g., a button, knob, dial, etc.) may be configured for directly controlling a setting of the exercise machine such as the resistance (or braking) setting, damper level or an adjustable tilt damper, etc. In some embodiments, one or more of the input devices may indirectly control machine settings, such as via the processor. For example, an input device 860 may be in communication, directly or via the processor 852, with a controller that actuates the resistance mechanism or other mechanism on the exercise machine.

In some embodiments, one or more settings of the exercise machine may be adjusted by the processing element 852 based on an exercise sequence or program stored in memory 854. In some examples, the exercise program may define a sequence of time intervals at various resistance levels, incline levels and/or other re-configurable (by the user) setting of the exercise machine. In some embodiments, the console 850 may additionally or alternatively communicate the exercise sequence to the user, such as in the form of instructions (e.g. audio and/or visual) on the timing of and settings to which a user should adjust the configuration of the exercise machine to correspond to the exercise program. In some embodiments the exercise program may be adapted (e.g., by processor 852) over time based on the user's prior performance of an exercise program or portion(s) thereof. The console 850 may be configured to enable the user to interact with the exercise program, such as to manually adjust it and/or override it (e.g., for exercising in manual mode).

In some embodiments, the console may be configured to present, independent of or concurrently with an exercise program, stored or streaming video content (e.g., scenery which may be recorded and/or computer generated), the playback of which may be dynamically adapted, in some embodiments, based on the user's driving of the moveable components of the exercise machine. For example, when the user's rotating the crank shaft faster the playback may speed up so as to give the impression of the user advancing through the scenery, and conversely, when the user's cadence decreases, the playback may slow down correspondingly to mimic the slower pace or cadence of the user. The scenery may be presented from the vantage point of the user or from a different vantage point, such as a vantage point behind or above (i.e., a bird's-eye view) an avatar of the user. In some embodiments, an exercise program and/or automatic control of the exercise machine may be effected in synchrony with displayed video. For example, a video may display scenery that includes flat and hilled terrain, and the resistance level of the exercise machine may be automatically adjusted, or instructed to be adjusted by the user, to mimic the user's perception that they are navigating similar terrain as that displayed in the video. The display may enable providing an interactive experience for the user, such as by providing an interactive environment according to any of the examples herein. In some embodiments, the interactive environment may be implemented in accordance with any of the examples described in U.S. Pat. No. 10,810,798, titled "Systems and Methods For Generating 360 Degree Mixed Reality Environments," which is incorporated herein by reference for any purpose.

Additional examples of swivel mounts, and features thereof, for rotatably coupling a display to an exercise machine are described further with reference to FIGS. 9-24. Swivel mounts according to the present disclosure may include a first portion which is fixed to either the display or the frame of the exercise machine. The term fixed, when referring to one component being mounted to another comportment, implies rigidly mounting the two components so as that they remain fixed relative to one another during normal use. The swivel mount assembly further includes a second portion fixed to the other one of the display and frame. The first and second portions are operatively coupled to form a rotatable joint with a rotational resistance mechanism (or simply rotational brake). The resistance applied by the rotational brake is adjustable, allowing the resistance to rotation to be sufficiently decreased (in the unlocked state) to allow the user to reposition the display. In embodiments herein, the interface or coupling of the first and second portions may be implemented by a ball and socket joint having a rotational resistance (or brake) mechanism that resists the rotation of the ball. In some embodiments, the socket portion of the ball and socket joint is fixed to the frame (e.g., as in the examples in FIGS. 9-17. In other embodiments, the socket portion of the ball and socket joint is fixed to the display (e.g., as in the examples in FIGS. 19-24). The swivel mount according to various examples herein may enable the simultaneous rotational and elevation adjustment of the display when the rotational brake is in the unlocked state.

Figure 9:
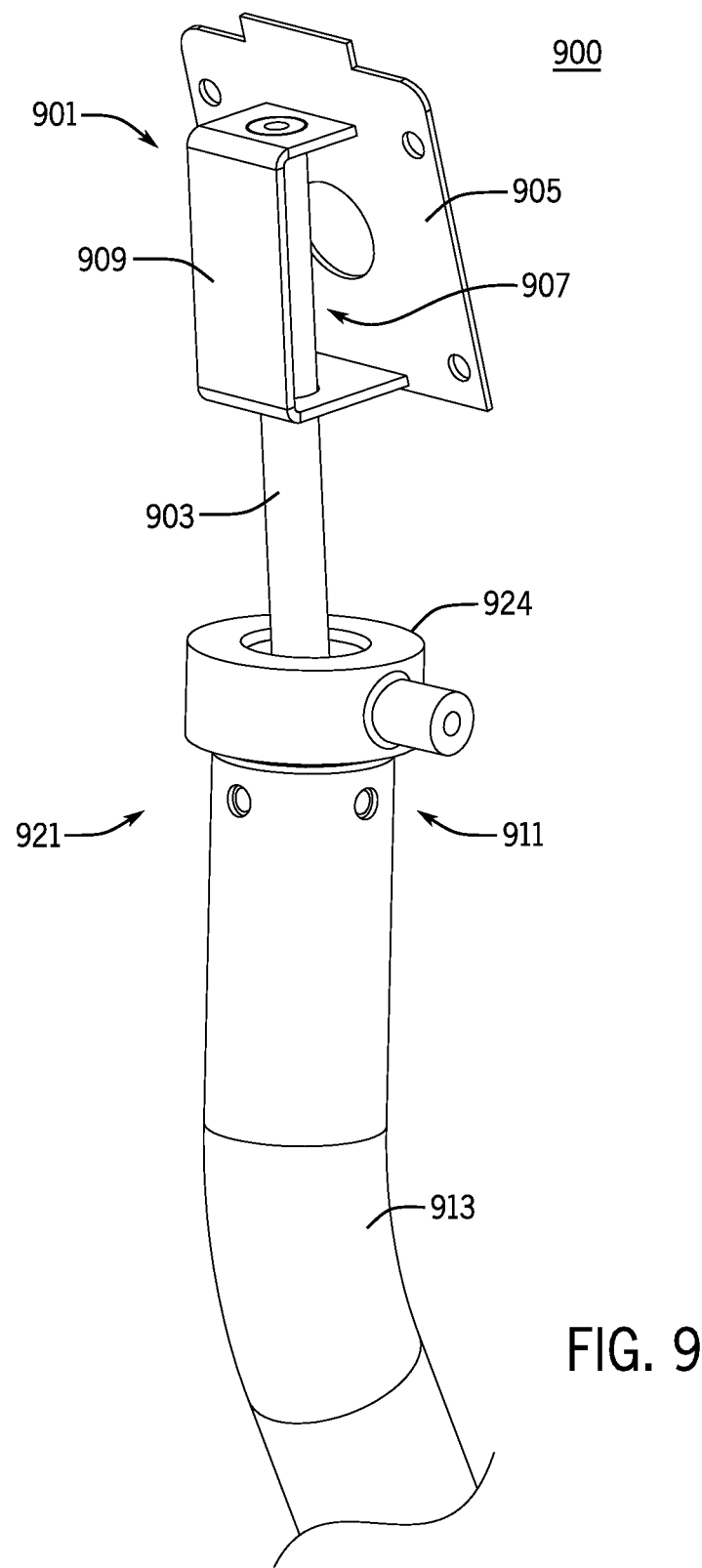
FIG. 9 shows an isometric view display swivel mount according to a further embodiment of the present disclosure.
Figure 10:
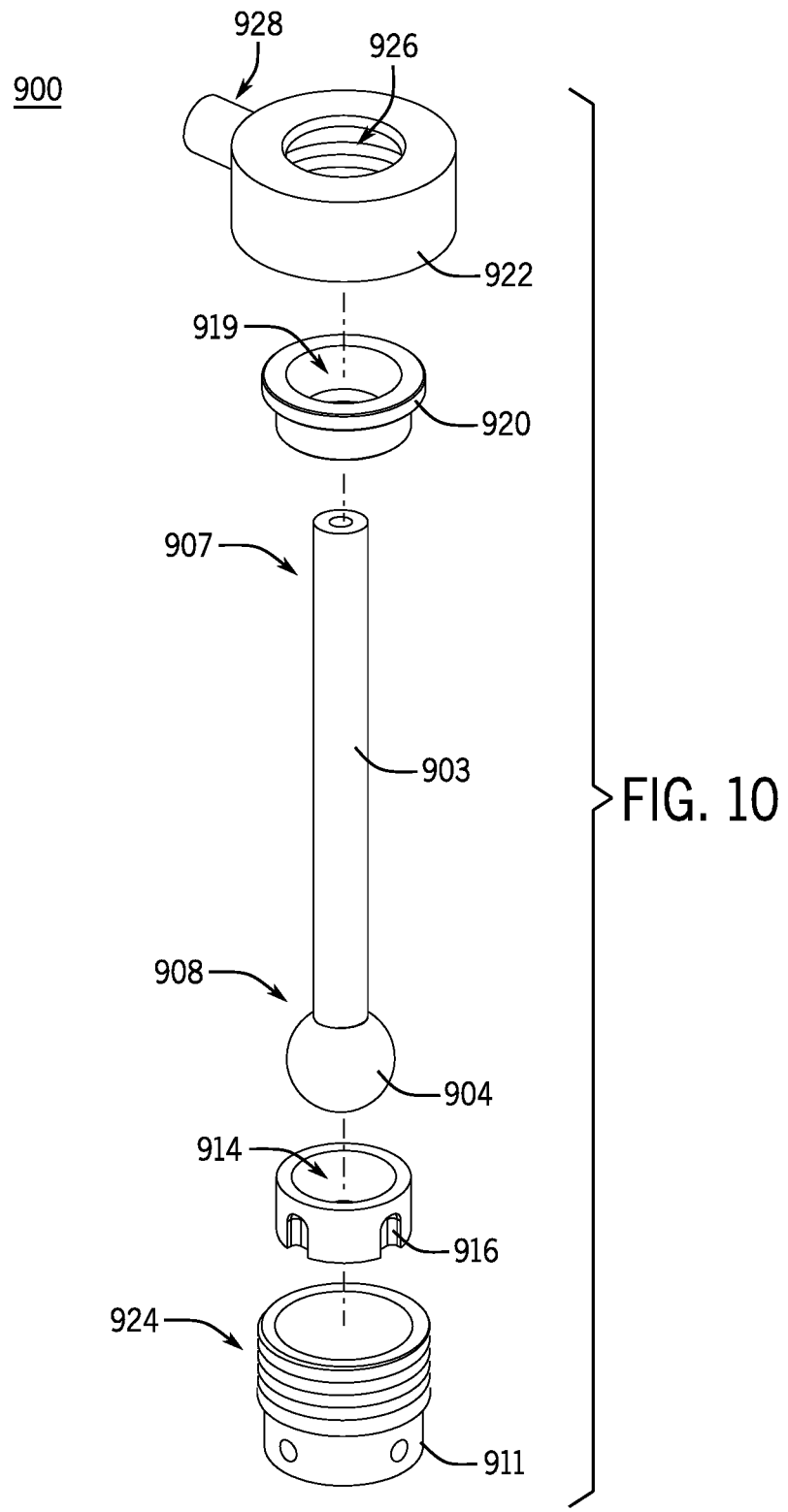
FIG. 10 shows an exploded view of the display swivel mount of FIG. 9.
Figure 11:
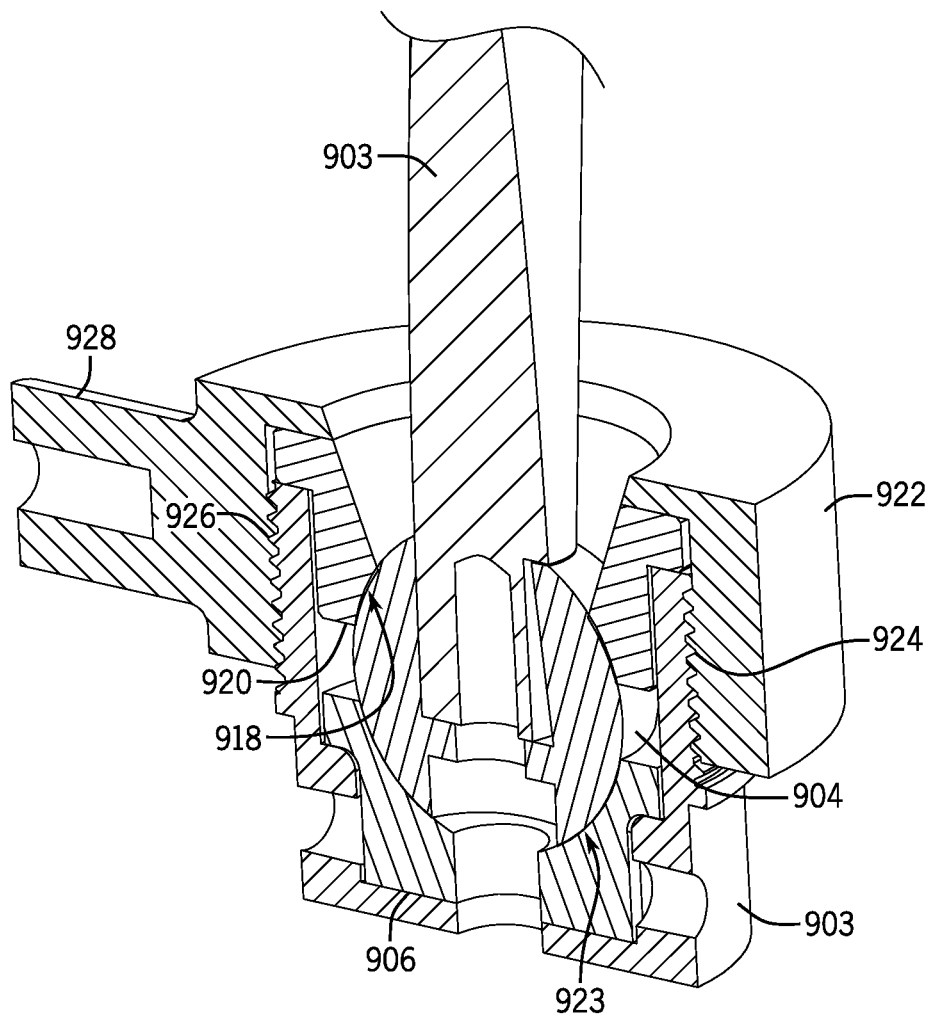
FIG. 11 shows a section view of the display swivel mount of FIG. 9.

FIGS. 9-11 illustrate an embodiment of a swivel mount assembly 900 for coupling a display (not shown) to the frame of an exercise machine. The swivel mount assembly 900 may be configured to couple the display to a terminal end 911 of an upright frame member 913 (e.g., mast 722 of the bike 700 of FIG. 7). In some such embodiments, a portion of the swivel mount assembly 900 is thus located at the terminal end 911 of the frame member 913. In other embodiments, the swivel mount assembly 900 may be differently suitably situated on the frame of the exercise machine.

The swivel mount assembly 900 includes a first portion 901 configured to be fixed to the display. That is, in normal use, the first portion 901 remains fixed relative to the display including at times when the display and/or exercise machine is in use as well as during times when the position of the display is being adjusted. The first portion 901 includes a rigid arm 903, which is configured, such as via a mounting plate 905, to be fixed, at its first end 907, to the display. In the illustrated example, a bracket 909 extends from the back of the mounting plate 905 and the rigid arm 903 is bolted (or may be otherwise rigidly mounted) to the bracket 909. In some embodiments, the rigid arm 903 may be rigidly mounted (e.g., welded, bolted, integrally formed with, or otherwise rigidly joined) to the plate 905 in any other suitable manner. The rigid arm 903 may extend in any suitable direction from the mounting plate 905, and terminates with a ball-shaped rigid body (or simply ball) 904 at its second end 908 (see FIGS. 10 and 11).

The second portion 921 of the swivel mount assembly 900 is coupled to the frame, e.g., to the terminal end 911 of frame member 913. The second portion 921 defines a cavity 923 that operatively accommodates the ball 904 and may thus be interchangeably referred to as a socket 921. The ball 904 is at least partially received in the cavity 923 and is rotatable therein when the swivel mount assembly is in the adjustable (or unlocked) state. The socket 921 includes a resistance mechanism 902 that selectively resists the rotation of the ball 904, when the swivel mount assembly is in the locked state. The resistance applied by the resistance mechanism 902 is adjustable by the user. In the present example, the cavity 923 is defined at least in part by a contoured upper portion 914 of a base member 916 and a contoured lower portion 918 of a cap member 920. In this example, the cap member 920 is movably coupled to the base member 916 and may also be referred to as the movable member or break pad of the resistance mechanism 902. The cap member 920 defines a frustoconical through-aperture 919 that connects the contoured lower portion 918 to the opposite side of the cap member 920, providing a passage for the rigid arm 903 through the cap member 920.

The base member 916 may be operatively coupled (e.g., press-fit and/or otherwise fixed) to the terminal end 911 of the frame member, providing a seat for the ball 904. A cover 922 retains (or secures) the cap member 920 and the ball 904 to the terminal end 911. The cover 922 is movably coupled to the terminal end 911, in this example threadedly coupled via cooperating threads 924 and 926 of the cover 922 and terminal end 911, respectively, and may thus be referred to as a screw top. In some embodiment at least one of the base member 916 and the cap member 920, or optionally both, are made from a resilient material (e.g., hard durometer elastomer such as rubber). Moving the cover 922 toward the terminal end 911 (e.g., tightening the screw cap) moves the cap member (or brake pad) 920 towards the ball 904 thereby increasing the pressure on the ball, which frictionally increases the resistance to rotation of the ball. Conversely adjusting the cover 922 in the opposite direction (e.g., loosening the screw top) reduces the force applied to the ball 904 via the brake pad, thus decreases the rotational resistance on the ball and allowing the rigid arm 903 to be repositioned for adjusting the display. The cover 922 may be provided with a handle 928 or other contouring (e.g., shaping the periphery of the handle as a knob) to facilitate manual adjustment (e.g., tightening and loosening) of cover 922 relative to the terminal end 911.

Figure 12B:
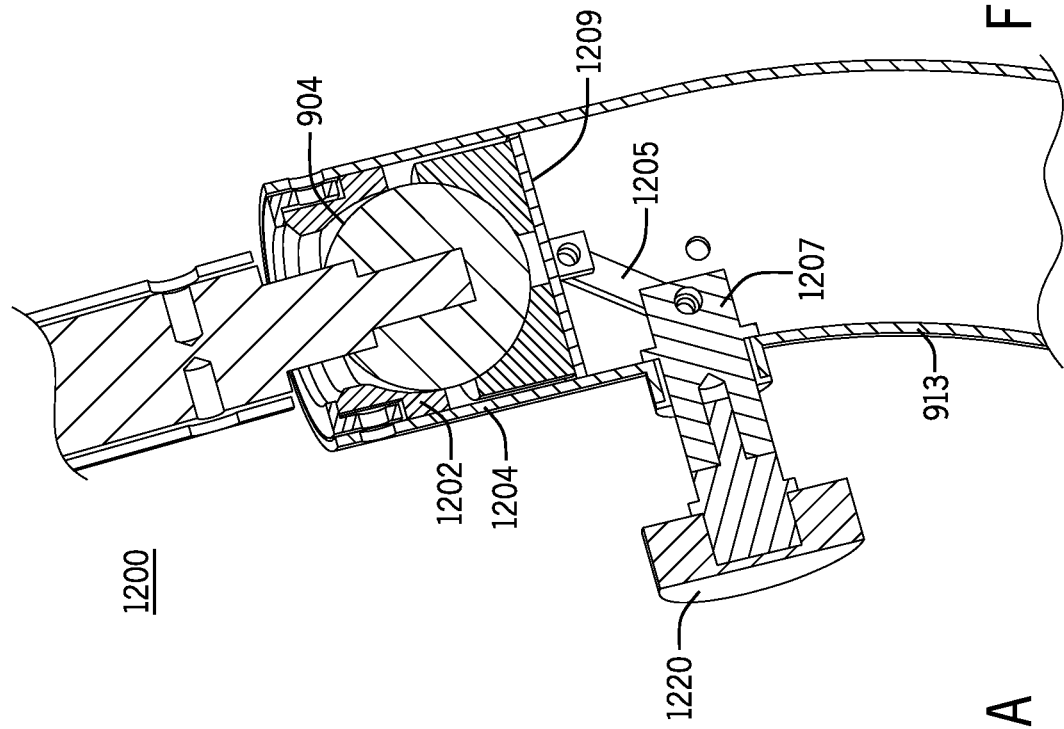
FIGS. 12A and 12B show section views of a display swivel mount according to further embodiments herein, showing the rotational resistance mechanism in the engaged (or locked) configuration and disengaged (or unlocked) configuration, respectively.
Figure 12A:
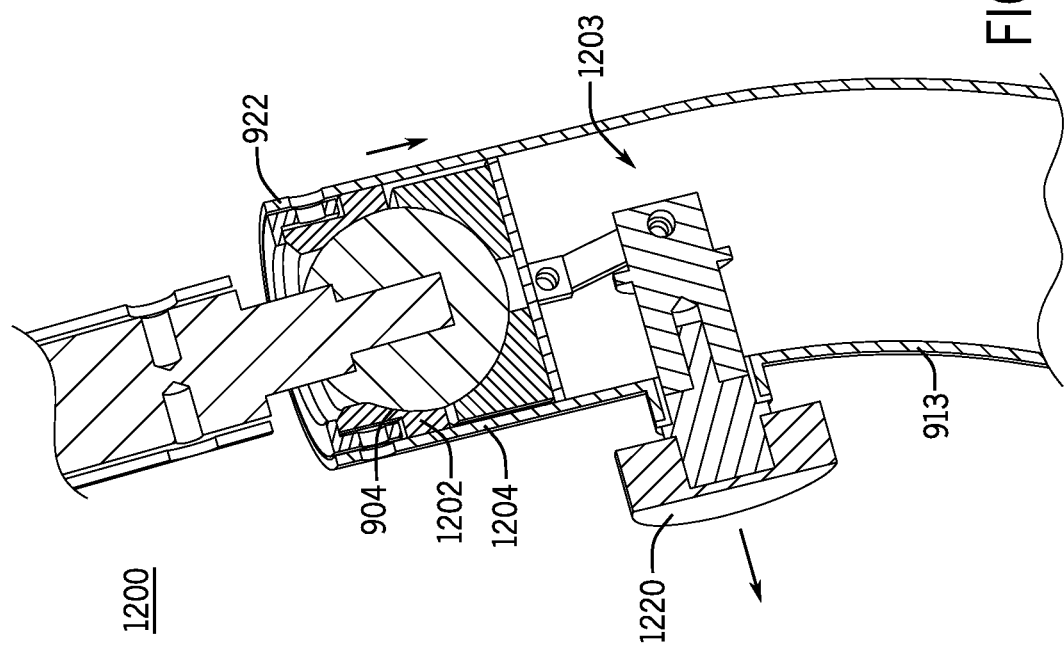

FIGS. 12A-12C show another example of a rotatable joint of a swivel mount assembly 1200 according to the present disclosure. Similar to the preceding example, the cavity that accommodates the ball 904 is defined by upper and lower members 1202 and 1204. However in this example, the lower member 1204 moves relative to the frame member 913 and may be referred to as a brake pad. The upper member 1202, which defines an upper portion of the cavity, is fixed to the terminal end 911, for example via a non-movable cover 1206. The lower member (or brake pad) 1204, which defines a lower portion of the cavity, is selectively movable relative to the upper member 1202. At least one of the upper and lower member 1202 and 1204 (e.g., the brake pad), and in some embodiments optionally both of the members 1202 and 1204, may be formed of resilient material (e.g., rubber or other suitable elastomer). The brake pad 1204 is moveably coupled within the interior of the frame member 913 via a linkage 1203. One end of a connecting link 1205 of the linkage 1203 is pivotally coupled to the base of the brake pad 1204 (e.g., directly thereto or to a rigid base 1209 supporting a resilient brake pad). The other end of the connecting link 1205 is pivotally coupled a pop pin 1220. The pop pin 1220 includes a handle 1209 exterior to the frame member 913 and fixedly joined to an actuation link 1207 extending transversely into the interior of the frame member 913. In use, actuation of the pop pin 1220 away from the frame member 913 (e.g., by pulling on the handle 1209) moves the link 1207 transversely in a first direction, which pulls on the connecting link 1205 causing the lower member 1204 to move downwardly (e.g., as shown in FIG. 12B). In this position, the resistance to rotation of the ball 904 is decreased and adjustment of the display is enabled. Conversely, when the pop pin 1220 is pushed towards the frame member 913, the brake pad 1204 moves upward, pressing the ball 904 against the upper member 1202, thereby increasing the resistance to rotation and locking out the rotation of the swivel mount assembly. In some embodiments, the pop pin 1220 may be biased (e.g., via a sprint) towards the locked position (e.g., the position in which the pin is retracted toward the mast) such that to release the locking mechanism and enable rotational adjustment of the display the user may pull on the pop pin against the biasing force of the spring.

Figure 13B:
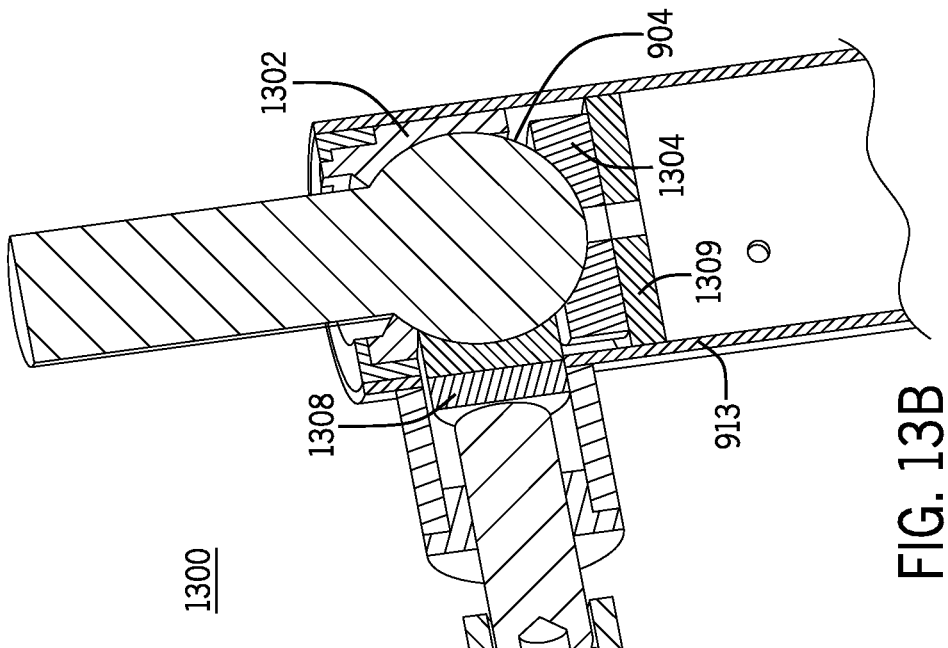
FIGS. 13A and 13B show section views of a display swivel mount according to further embodiments herein, showing the rotational resistance mechanism in the disengaged (or unlocked) and engaged (or locked) configuration, respectively.
Figure 13A:
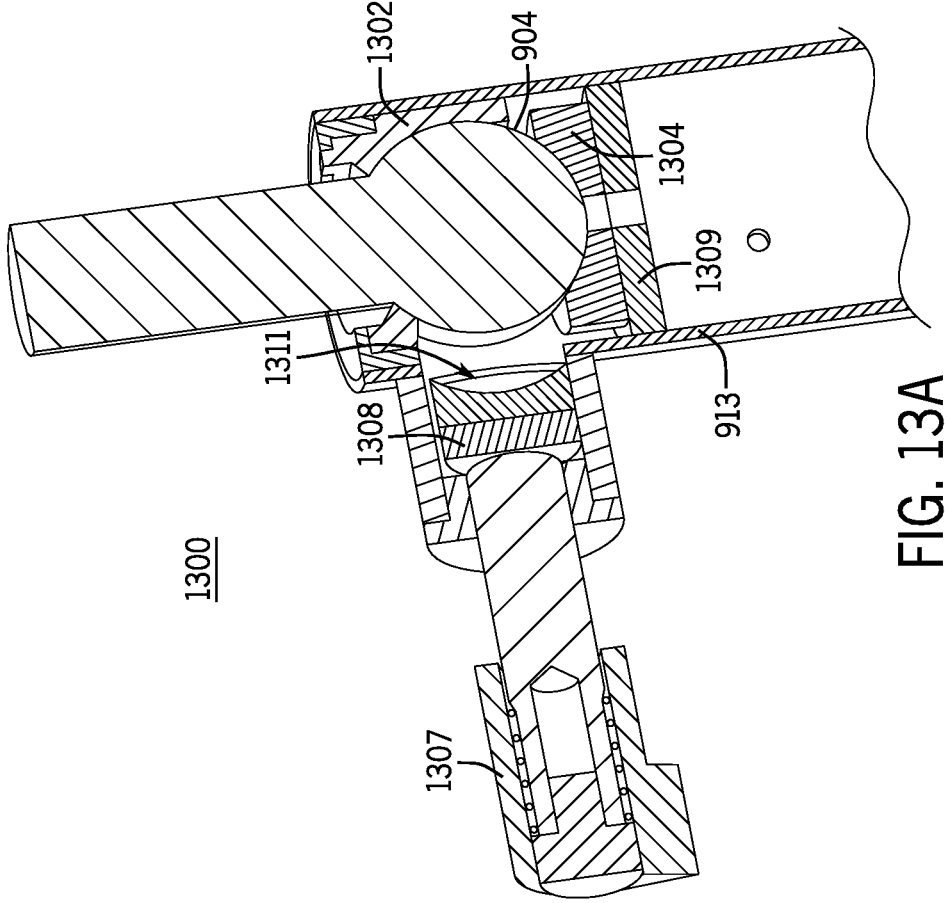
Figure 13C:
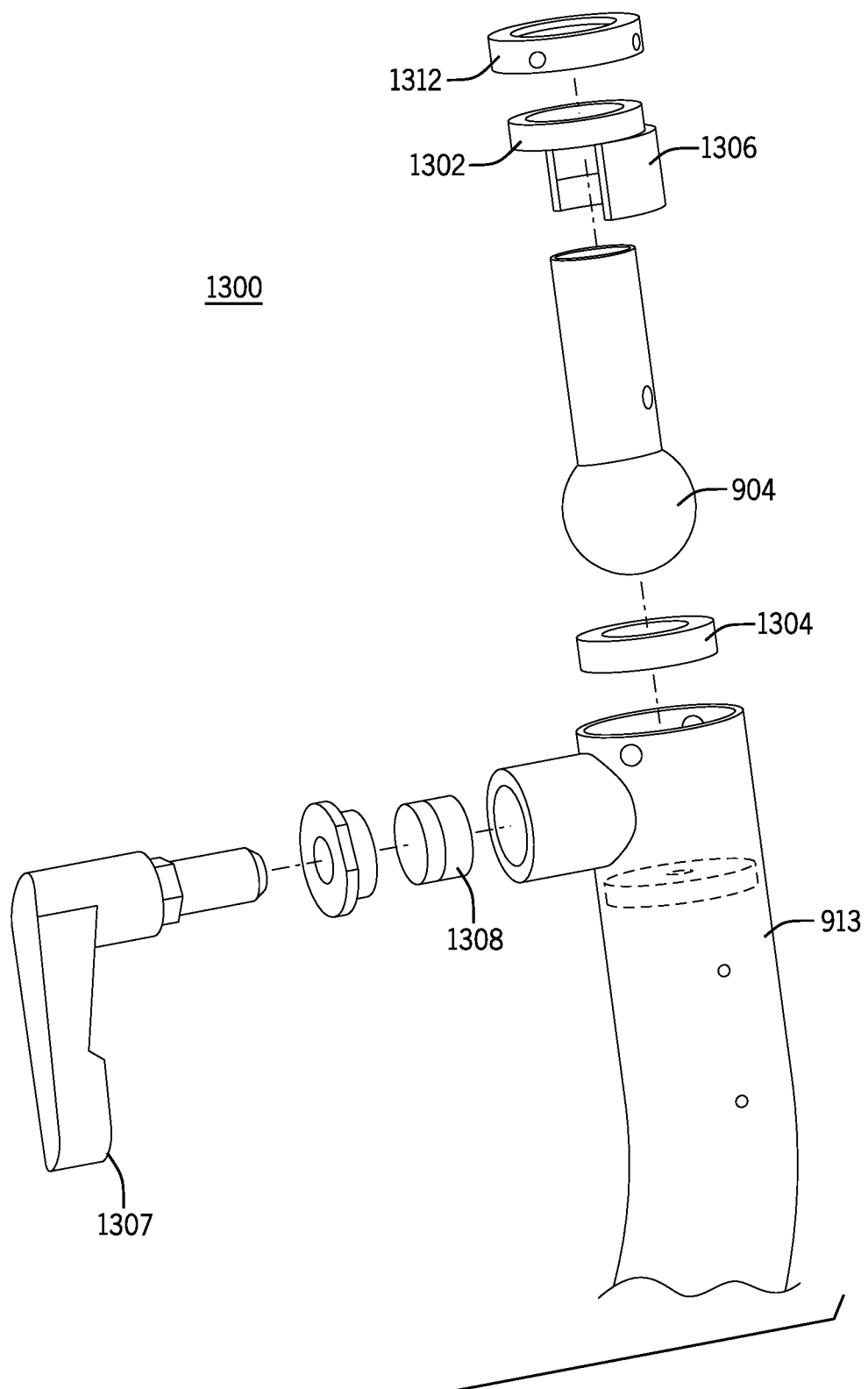
FIG. 13C shows a partial exploded view of the display swivel mount in FIGS. 13A and 13B.

FIGS. 13A-13C show another example of a rotatable joint of a swivel mount assembly 1300 according to the present disclosure. In this example, the cavity that accommodates the ball 904 is defined, in part, by upper and lower members (or pads) 1302 and 1304. The upper and lower pads 1302 and 1304 are configured to remain substantially fixed relative to the frame member 913. In this example, the rotational resistance force on the ball 904 is applied by a side stop 1308, which presses the ball 904 against a side member (or skirt) 1306. In some embodiments, the face 1311 of the side stop 1308 that presses against the ball 904 may be contoured to a complementary shape to the ball 904 or any other suitable contour to apply the desired pressure or force against the ball for frictionally resisting the movement of the ball 904. In other embodiments, the face 1311 may be substantially planar. The upper and lower pads 1302 and 1304 are spaced apart and positioned over and under, respectively, the ball 904. In some embodiments one or both of the pads 1302 and 1304 is made from a resilient material (e.g., rubber). The pads 1302 and 1304 may be arranged to contact the ball 904 but the frictional force on the ball 904 resulting solely from contact by the pads 1302 and 1304 may not be sufficient to substantially fully restrict the rotation of the ball 904. In some embodiments, the frame member 913 may be implemented by a tube and a rigid base 1309 may be provided transversely near the terminal end of the tube to support a resilient lower pad 1304. The upper pad 1302 is secured over the ball 9004 by a fixed cap 1312. In some embodiments, the skirt 1306 extends from one of the upper or lower pads 1302 and 1304. In the illustrated example, the skirt 1306 is part of the upper pad 1302, but in other examples, the skirt may be joined to the lower pad instead. In yet other examples, the skirt may be provided in part by a downward extension of the upper pad and an upward extension of the lower pad. In yet other embodiments, the skirt may be separately formed from either of the two pads. The side stop 1308 is positioned at a peripheral location of the ball 904 opposite the skirt 1306 and is movable toward or away from the ball 904. The side stop 1308, when actuated by handle 1307, moves toward the ball pressing the ball against the skirt 1306 to substantially immobilize the ball within the cavity and lock the swivel mount into position. Conversely, when the handle 1307 is actuated in the opposite direction, the force pressing the ball 904 against the skirt 1306 is reduced such that the ball 904 can be rotated within the cavity. The handle may be operatively coupled to the mast in any suitable manner to apply a force on the side stop, e.g., by being threaded to a transverse opening in the frame member 913 and/or by being biased toward the frame member 913.

Figure 14:
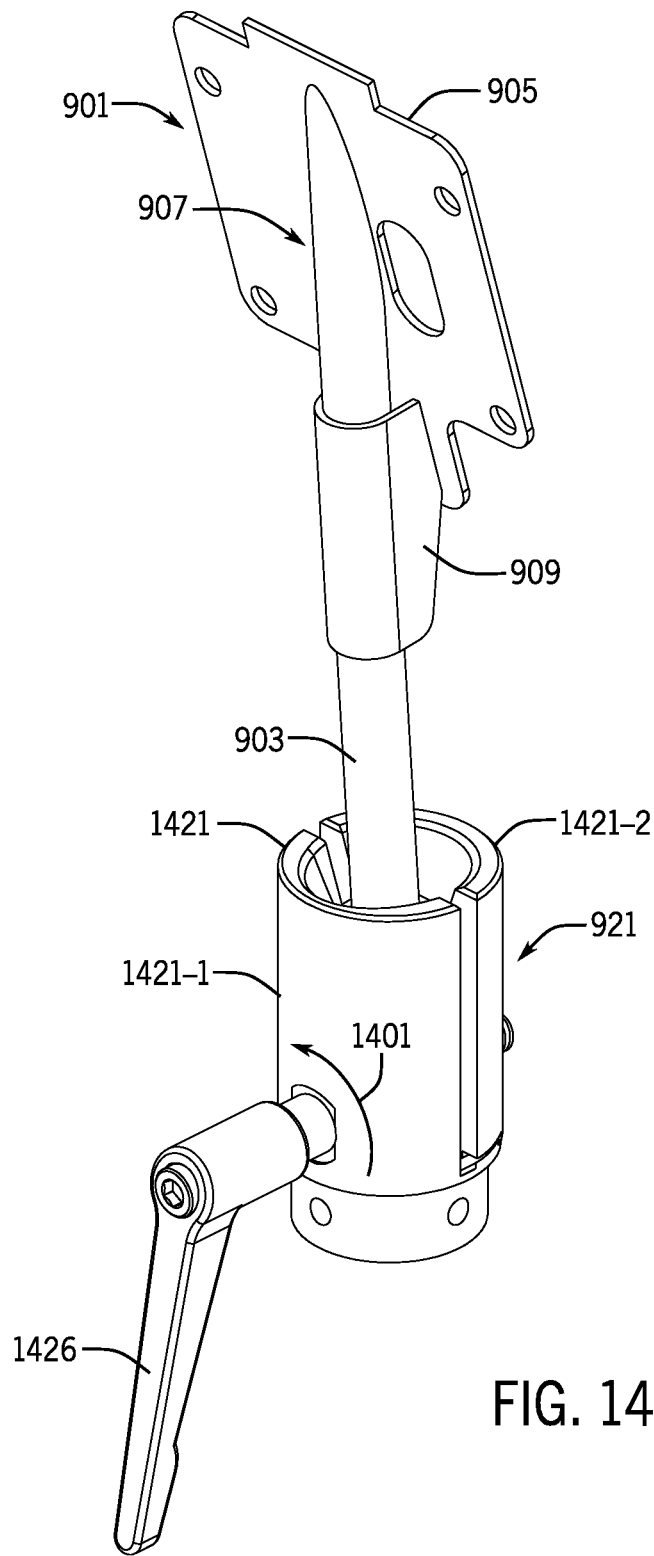
FIG. 14 shows a display swivel mount according a further embodiment herein.
Figure 15:
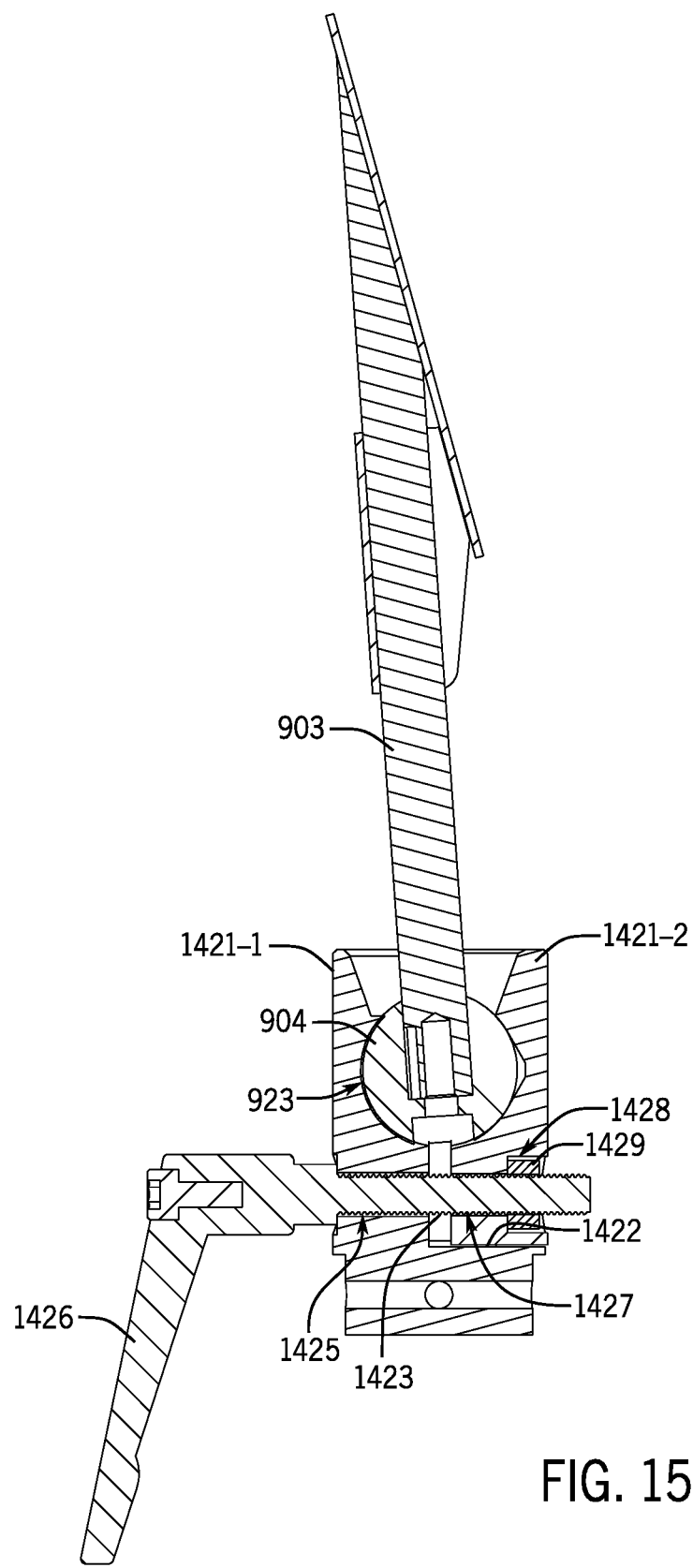
FIG. 15 shows a section view of the display swivel mount in FIG. 14.
Figure 16:
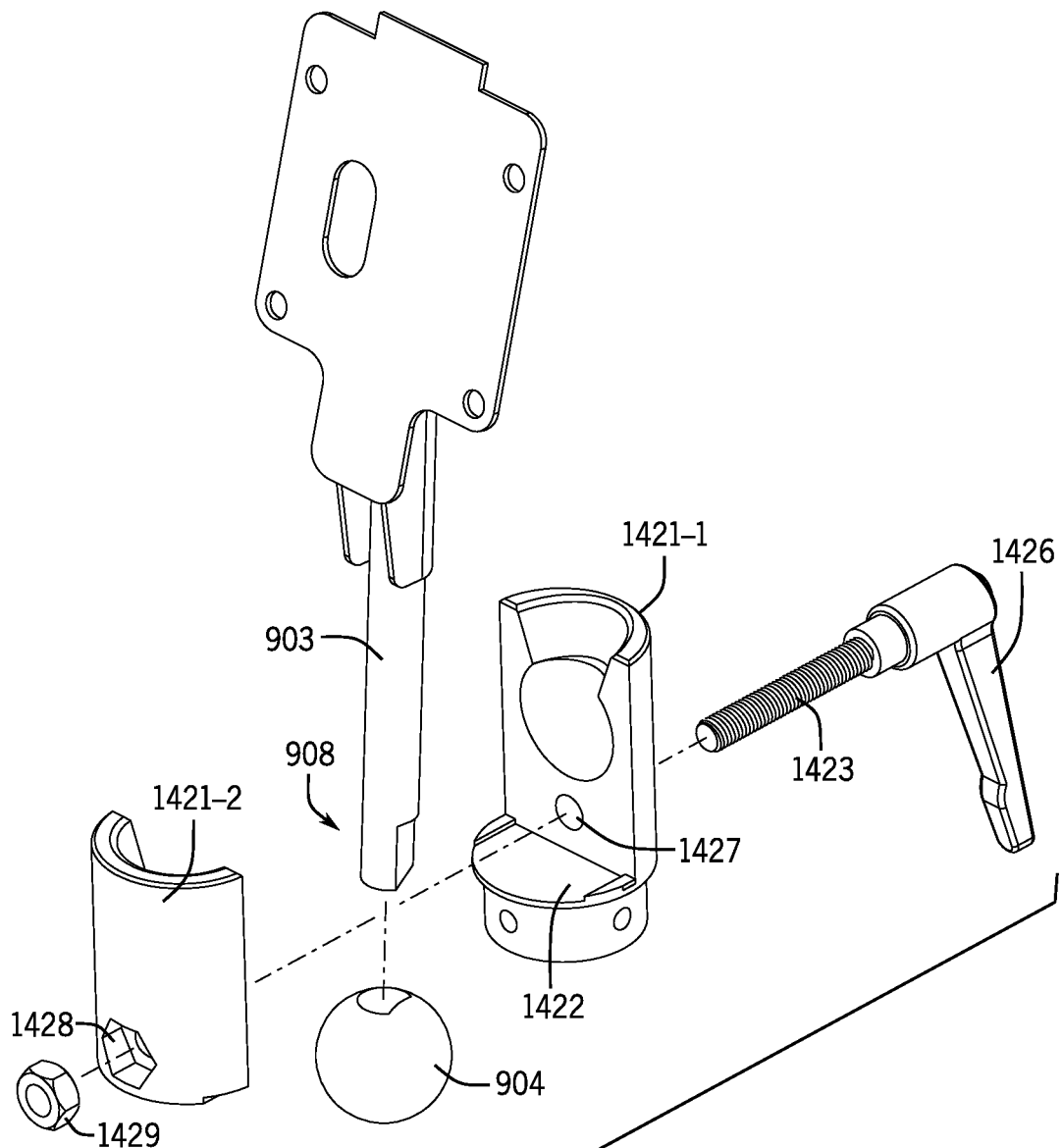
FIG. 16 shows a partial exploded view of the display swivel mount in FIG. 14.

FIGS. 14-16 show yet another example of a swivel mount assembly 1400 for rotatably coupling a display to an exercise machine. The swivel mount assembly 1400 includes a first portion 901 configured to be fixed to the display, and a second portion 921, which in use is fixed to the exercise machine frame. The first portion includes a rigid arm 903, a display mounting plate 905 fixed at one end 907 of the rigid arm 903, and a ball-shaped body (or simply ball) 904 fixed to the opposite end 908 of the rigid arm 903. The mounting plate 905 may be fixed (or rigidly jointed) to the rigid arm in any suitable manner such as by being welded or bolted thereto, optionally using one or more arm supporting brackets 909. The ball 904 in this embodiment, and in any of the other embodiments of ball-and-socket type rotatable joints, may be separately formed from the rigid arm and rigidly fixed thereto (e.g., by being bolted as shown in FIG. 15), or it may be integrally formed with the rigid arm. The ball 904 is operatively engaged with the second portion 921 to form a ball-and-socket joint, the resistance to the rotation of which is selectively varied by a resistance mechanism 1402. In this example, the socket portion of the ball-and-socket joint (e.g., second portion 921) is implemented, in part, by a clamp 1421 configured to selectively resist the rotation of the ball 904.

The second portion 921 (e.g., clamp 1421) defines a cavity 923 that accommodates the ball 904 (see FIG. 15). In this example, the cavity 923 is substantially spherical and is defined in part by a first portion (e.g., side member 1421-1) of the clamp 1421 and a second side portion (e.g., side member 1421-2 positioned opposite side member 1421-1), which are movably joined to form the clamp 1421. When assembled to the frame of the exercise machine, one of the first and second portions of the clamp (e.g., side member 1421-1) is fixed to the frame and may thus be referred to as fixed member. The other one of the first and second portions of the clamp (e.g., side member 1421-2) is movably coupled to the frame and may thus be referred to as the movable member. The fixed member (e.g., side member 1421-1) may include a ledge 1422 extending under the movable member (e.g., side member 1421-2), which may at least partially support the movable member.

In some embodiments, the movable member (e.g., side member 1421-2) is operatively joined to the fixed member via a screw 1423 that passes through the fixed member and terminates in the movable member. The screw 1423 may be threaded at least along a portion thereof, and in some embodiments along substantially the full length thereof, such that at least its terminal end of the screw 1423 engages a cooperating thread associated with the movable member (e.g., side member 1421-2). In some embodiments, the cooperating thread may be provided on the inner wall of a passage 1425 of the movable member. In other embodiments, the cooperating thread may be provided by a nut 1429, which may be received, in part, in a concentric recess 1428 on the outer side of the movable member. In some embodiments, the passage 1427 may also include thread for threadedly coupling the screw to the fixed side member of the clamp. A handle 1426 (e.g., a lever handle or knob handle) is provided at one end of the screw e.g., at the end of the screw proximate the fixed member, for ease of actuation of the clamp 1421 (e.g., tightening and loosening of the screw) by a user. In use, as the screw 1423 is adjusted in a first direction (e.g., counterclockwise direction as shown by arrow 1401), the screw moves out of the passage 1425, which brings the movable member (e.g., side member 1421-2) toward the ball 904 thereby increasing the frictional force on the ball, thus increasing the rotational resistance applied by the clamp 1421. Conversely, when the screw 1423 is adjusted in the opposite direction (e.g., clockwise), the screw 1423 moves into the passage 1425, moving the movable member (e.g., side portion 1421-2) away from the fixed member and the ball, which reduces the resistance to rotation of the ball 904 thereby unlocking the swivel joint for adjustment.

Figure 17:
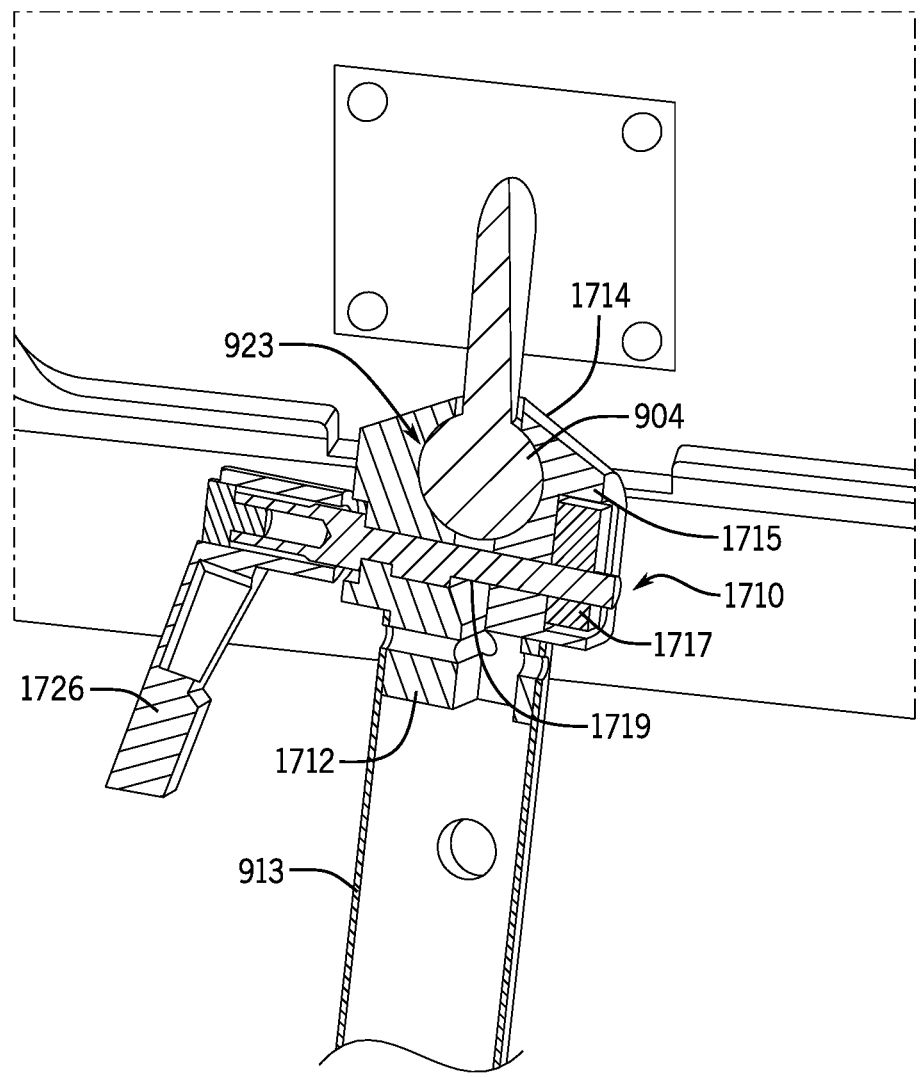
FIG. 17 shows a display swivel mount according a further embodiment herein.

FIG. 17 shows another example of a 1710 configured to provide rotational resistance at the rotational joint of a swivel mount assembly 1700 according to the present disclosure. The clamp 1710 includes a first side member 1712 and a second side member 1714. One of the side members (e.g., first side member 1712) is fixed, e.g., welded or bolted, to the frame member 913. The other side member (e.g., second side member 1714) is movably coupled to the fixed side member. The first side member 1712 may be formed of a substantially rigid material and defines one side of the rotational cavity 923 for the ball 904. The second side member 1714 defines the opposing side of the rotational cavity 923. At least a portion of the second side member 1714 (e.g., the portion that defines the cavity 923 and thus contacts the ball 904) is formed of a resilient material, such as hard durometer elastomer (e.g., rubber). The two side members of the clamp 1710 are held together by a rod 1719, which may be threadedly coupled to one or both of the side members in some embodiments. For example, the rod 1719 may be a threaded rod or screw that pass through a passage 1725 of the first side member 1712 and be threadedly joined to in the second side member 1714 (e.g., to a rigid block 1717 operatively associated with the second member 1714). The clamp block 1717 may be non-symmetrical about the screw's axis (e.g., over-long) such that when the screw is rotated, a greater force can be transferred through the resilient portion of the side member 1714 onto the ball 904. The rod 1719 may be threadedly coupled also to the first side member 1712 and may be operated similarly to clamp 1421 of the previously example. In other embodiments, the rod 1719 may be biased (e.g., by a spring) into a position corresponding to the locked position (e.g., in a direction away from the first side member 1712), and unlocking of the clamp 1710 for adjustment may involve pushing the rod 1719 (e.g., via the handle 1726) toward the side member 1714, which cause at least a portion of the second side member 1714 (e.g., the rigid block 1717) to move away from the side member 1712 reducing the force on the ball 904.

FIGS. 18A and 18B show another example of a ball-and-socket swivel mount 1800 according to the present disclosure, which uses a clamping mechanism (or clamp) 1810 to selectively resist rotation at the joint. In this example, the ball 904 is fixed (e.g., welded or bolted via the rigid arm 903) to the frame member 913 (e.g., to the terminal end of mast 722). The ball 904 thus remains in a fixed position relative to the frame when the display is adjusted. The clamp 1810 of the swivel mount 1800 is mounted to the display (not shown), e.g., via the mounting structure 1808. The clamp 1810 includes a first clamp arm 1811 which fixed to the mounting structure 1810, and thus referred to as fixed clamp arm. The clamp 1810 includes a second clamp arm 1813 which is movably (e.g., pivotally) coupled thereto, and thus referred to as movable clamp arm. Each of the first and second clamp arms 1811 and 1813 terminates with a respective clamp face (e.g., first and second clamp faces 1812 and 1814) that together define the cavity 923 in which the ball is selectively rotatably received. The movable clamp arm may be pivotally coupled to the mounting structure via a handle pivot 1815 and may be actuated via a handle 1826, which may be connected to the opposite end of the clamp arm 1813 from the clamp face 1814. The movable clamp arm is biased or tensioned (e.g., using one or more springs) towards the closed position in which the second clamp face 1814 is urged towards the first camp face 1812. For example, a torsion spring 1817 may be operatively engaged with the clamp arm 1813 at the handle pivot 1815. Additionally or alternatively, an extension spring 1819 may connect the movable arm to the fixed arm at a location proximate the clamp faces 1812 and 1814. The extension spring 1819 may be operatively associated with a travel limiter, or the amount of permitted separation of the clamp faces may be otherwise suitably limited, to prevent the display assembly (e.g., display and mount) from becoming disengaged from ball 904. In some embodiments a plurality of springs (e.g., torsion spring 1817 and extension spring 1819) may be used to provide sufficient clamping force onto the ball 904 and maintain the display in a set position.

Figure 19:
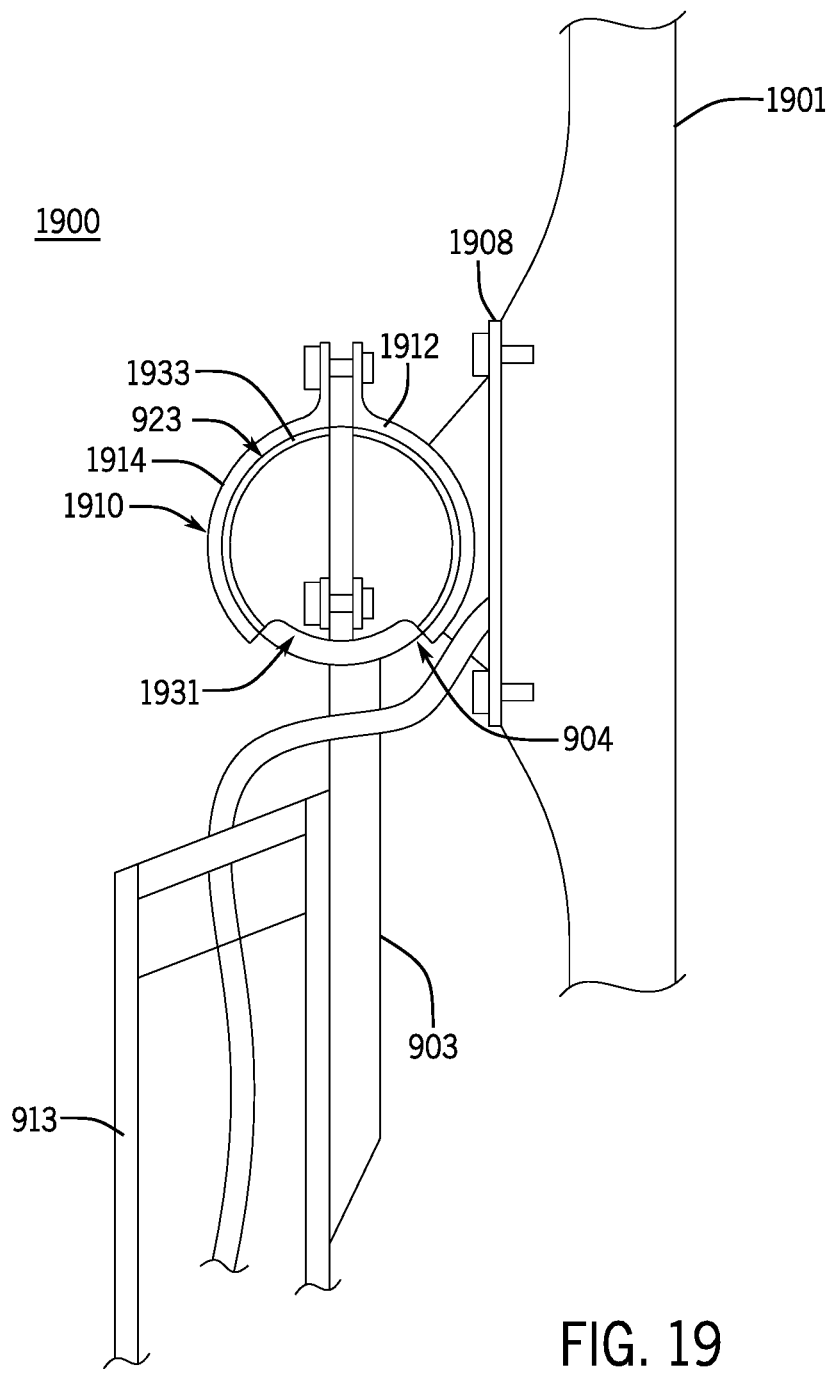
FIG. 19 shows a simplified illustration of another display swivel mount according to the present disclosure.

FIG. 19 shows another example of a ball-and-socket swivel mount 1900 for rotatably coupling a display 1901 to the frame of an exercise machine. The ball 904 is fixed to the frame (e.g., frame member 913) via a rigid arm 903. A mounting structure (e.g., plate 1908) is fixed to the back of the display 1901. A socket 1910 defines a substantially spherical rotational cavity 923 for the ball 904. The socket 1910 may be implemented by two half-shells 1912 and 1914, which are held together to define the substantially spherical cavity 923. A first one of the shells 1912 is fixed (e.g., welded) to the plate 1908, and the second shell 1914 may be operatively mounted to the first shell after installation of the ball 904 in the cavity 923. The arm 903 fixed to the ball 904 extends through a slot 1931 defined by the socket, rotational adjustment of the display 1901 is thus limited by the size of the slot 1931. In some examples, a bearing member (e.g., a plastic slider bushing 1933) may line the interior of the socket to provide a suitable rotatable interface between the ball and the socket. In some embodiments, the rotation of the ball within the socket may be selectively resisted (e.g., through friction and/or detent mechanism). In some embodiments, a detent mechanism may be used to align or urge the ball within one of a plurality of predetermined rotational positions relative to the socket.

Figure 20A:
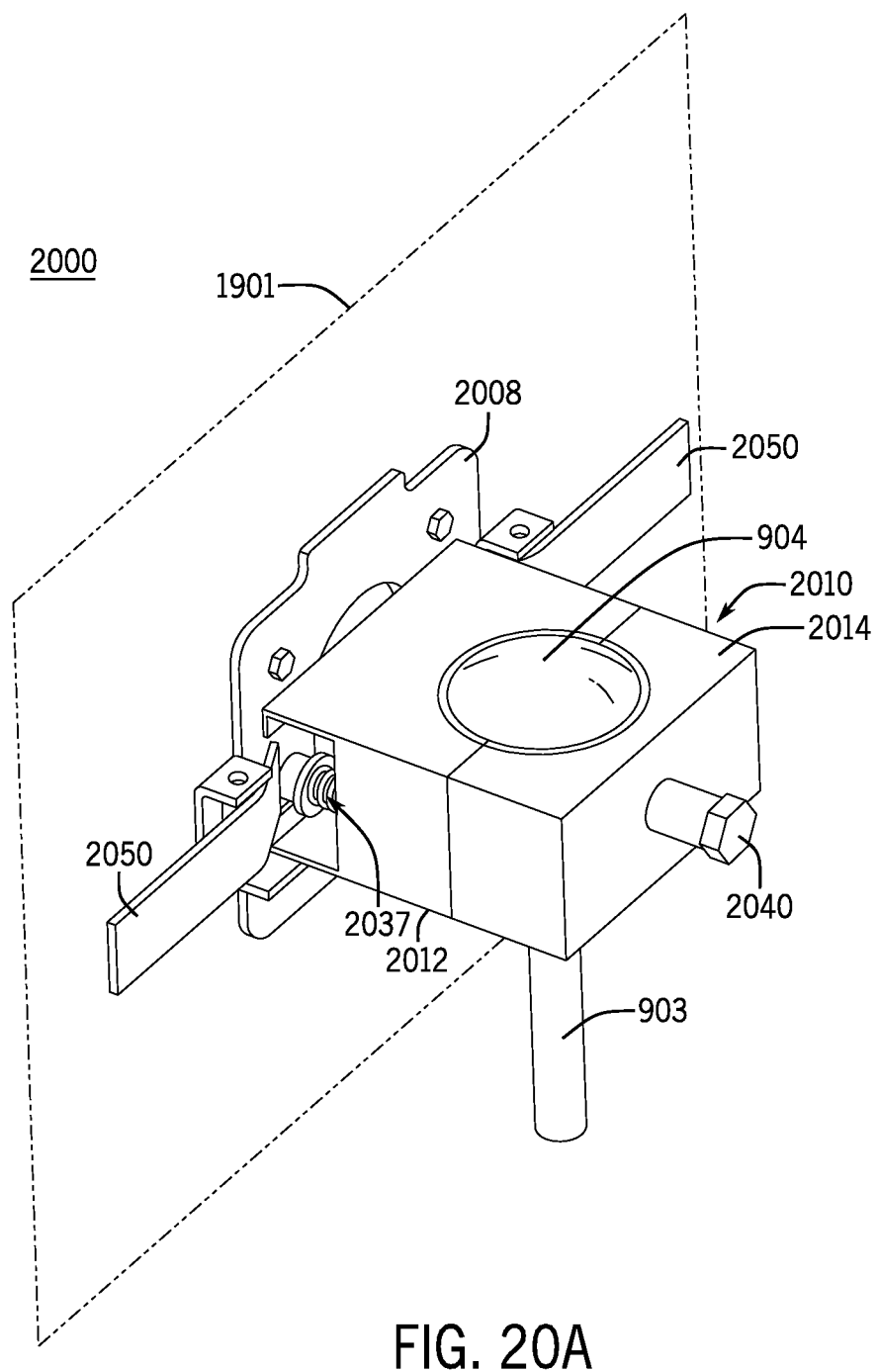
FIGS. 20A and 20B show an isometric and exploded views, respectively, of a display swivel mount according to the present disclosure.
Figure 20B:
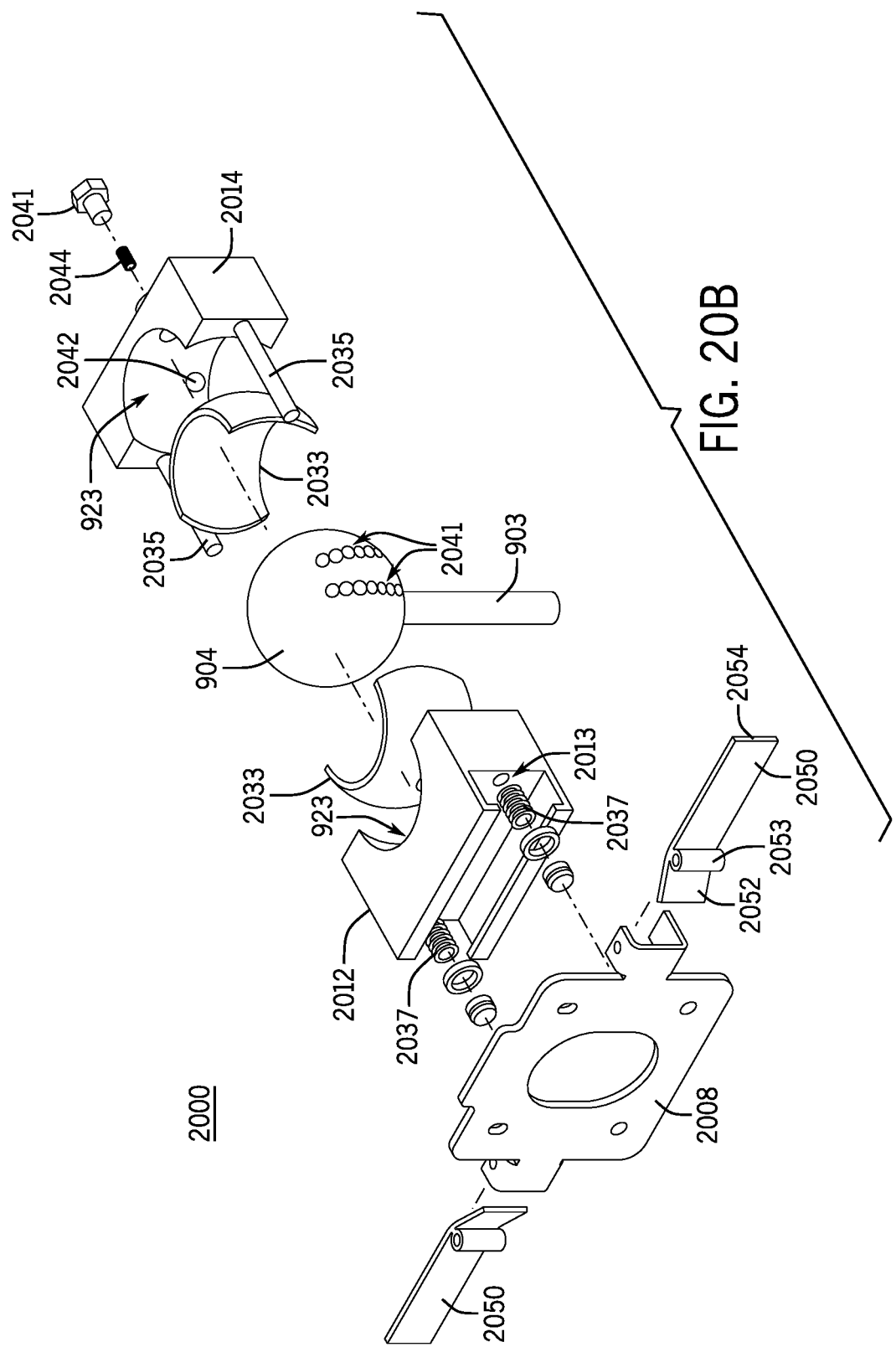
Figure 21B:
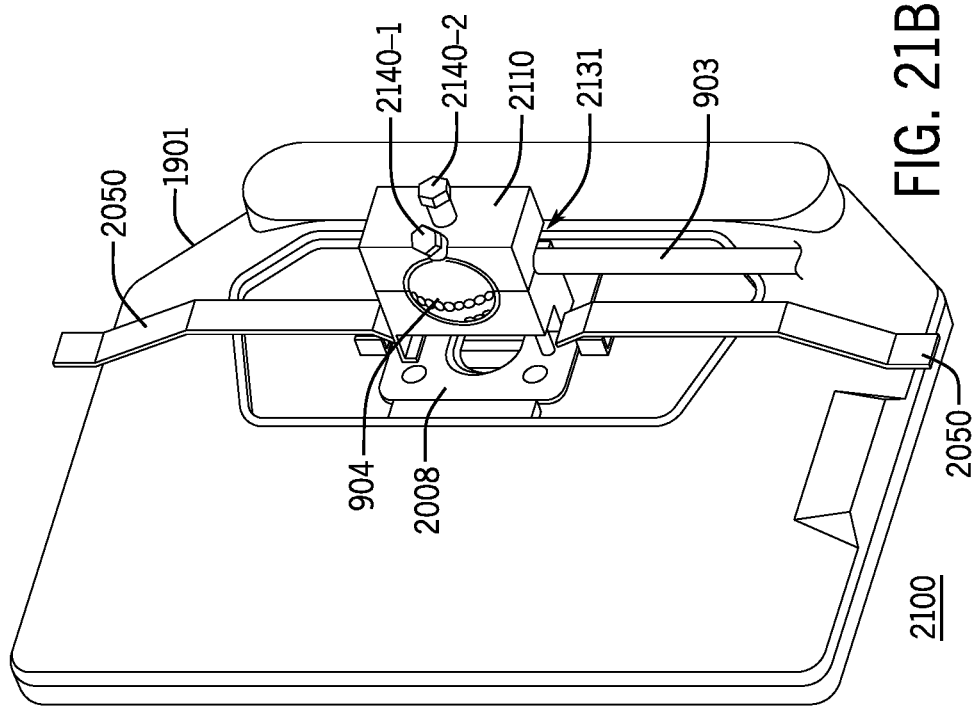
FIGS. 21A and 21B show views of display swivel mount configured to enable rotation of the display between portrait and landscape modes.
Figure 21A:
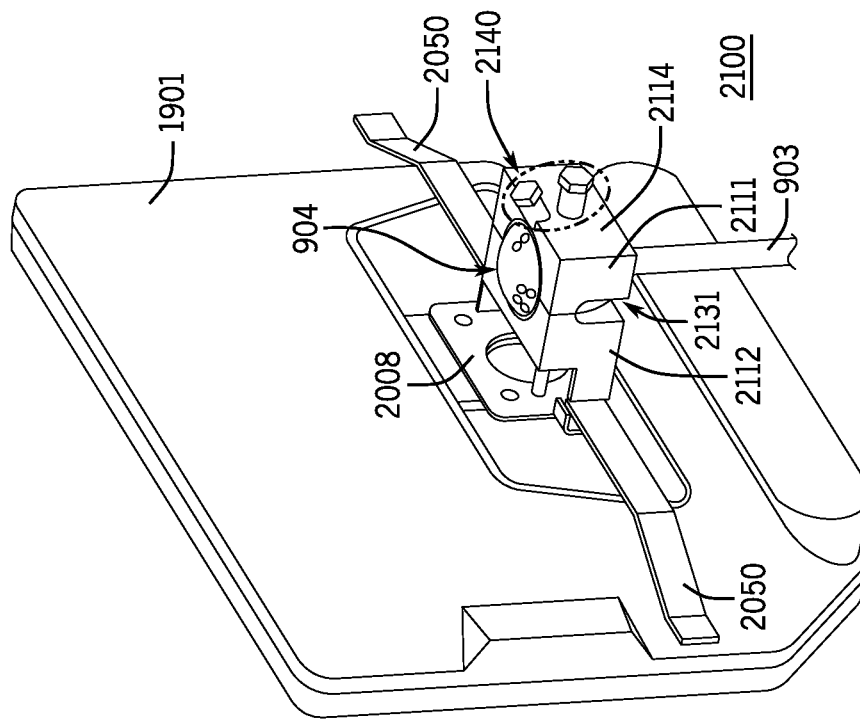
Figure 22:
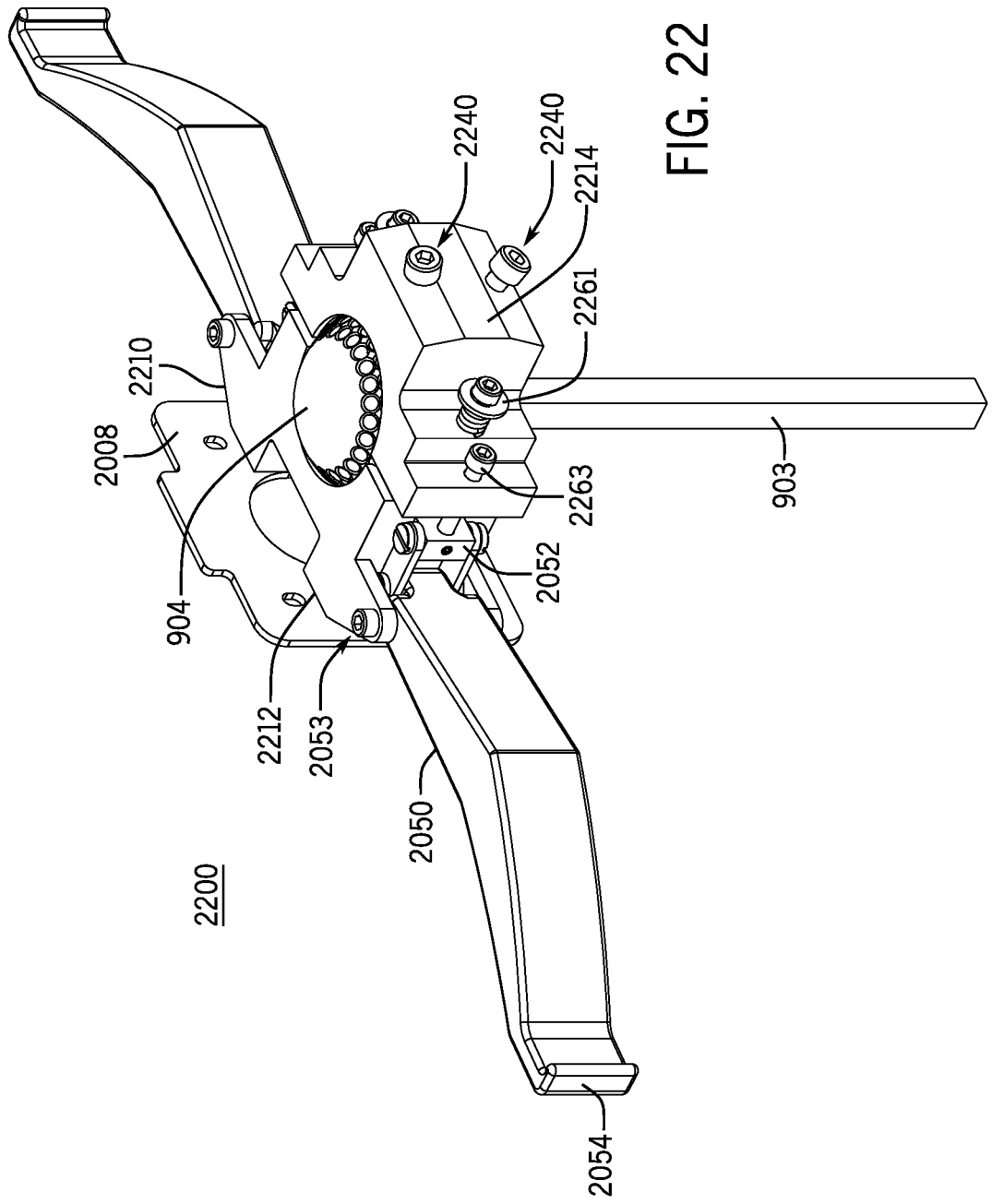
FIG. 22 shows an isometric view of a display swivel mount according to further embodiments herein.

For example, one or more detents operatively coupled to the socket to selectively engage the ball 904 may be used to selectively resist relative rotation between the socket (e.g., cavity 923) and the ball and/or to urge the ball 904 into one of a plurality of discrete, predetermined rotational alignments with the socket. FIGS. 20-24 show several examples of ball-and-socket swivel mounts with a detent mechanism that facilitates alignment of the display into any of a plurality of discrete positions and which resists rotation when the detent is engaged. FIGS. 20A and 20B show isometric and exploded views of a ball-and-socket swivel mount 2000 with a single detent. FIGS. 21A and 21B show view of an example ball-and-socket swivel mount 2200 with a double detent. FIGS. 22-24 show yet another example of a ball-and-socket swivel mount 2400 having a double detent. Any suitable number of (e.g., two or more) detents and/or other types of rotational resistance mechanisms may be used in various embodiments according to the present disclosure.

Referring to the example in FIGS. 20A and 20B, the swivel mount 2000 may include components similar to those of the swivel mount 1900. For example, the ball 904 may be fixed to the frame of the exercise machine via a rigid arm 903. The ball 904 is rotatably received in a substantially spherical cavity defined by the socket 2010, which, in use, is mounted to the display via the plate 2008. The socket 2010 is implemented as a clamp having a first clamp portion 2012 and a second clamp portion 2014. The first clamp portion 2012 remains fixed relative to the structure to which it is mounted (e.g., fixed to the display via plate 2008) during any positional adjustments of the display, and is thus also referred to as the fixed clamp portion. The second clamp portion 2014 is movably coupled to the first clamp portion 2012 and is thus also referred to as the movable (or moving) clamp portion. The first and second clamp portions 2012 and 2014, respectively, each have a contoured clamping face which together define the cavity 923. For example each of the clamp portions 2012 and 2014 have a substantially semi-spherically concave surface on the side facing the other clamp portion, such that together, a substantially spherical cavity 923 is defined. In some embodiments, a respective bushing 2033 having a corresponding (e.g., substantially semi-spherical) shape is provided between the respective contoured clamping face and the ball 904.

The movable clamp portion is actuated relative to the fixed clamp portion via a handle, which may be implemented as one or more levers or paddles 2037. In the present example two paddles 2037 are provided, each pivotally coupled to opposite side of the plate 2008. However, in other examples a single paddle or other suitable handle may be operatively arranged relative to the display mounting structure for actuation (e.g., disengaging) the movable clamp portion and/or detent and thus selectively reducing the rotational resistance of the swivel mount. In this example, the detent 2040 is implemented as a single ball detent including detent ball 2042, which is operatively engaged with (e.g., biased toward) the ball 904 of the swivel joint via a detent spring 2044, and secured to the socket 2010 (e.g., to the second clamp portion 2014) via a fastener 2041 (e.g., a bolt or any other suitable fastener).

The second clamp portion 2014 is movably jointed to the first clamp portion 2012 via one or more posts 2035, which, in this embodiment, extend from the second clamp portion 2014 into the first clamp portion 2012, and connect to a side 2013 of the first clamp portion 2012 opposite from side facing the second clamp portion 2014. The post(s) 2035 protrudes from the side 2013 of the first clamp portion 2012 and are coupled thereto via a nut or other suitable fastener. The second clamp portion 2014 is biased to the closed position, in which the second clamp portion 2014 is urged towards the first clamp portion 2012. For example, the second clamp portion 2014 may be biased toward the first clamp portion 2012 via a respective coil spring 2037 operatively associated with each post 2035. Each spring 2037 may be positioned between the nut and the side 2013, axially over the protruding portion of the respective post 2035, to resist axial movement of the post 2035, and thus movement of the second clamp portion 2014 away from the first clamp portion 2012. Each paddle 2050 has a first lever end 2052 near the fulcrum 2053 operatively position to engage (e.g., push on) the respective post 2035 when the paddle 2050 is actuated. The opposite, second lever end 2054 of the paddle 2050 may extend away from the fulcrum and toward, in some cases up to or beyond, the periphery of the display such that a user can conveniently manually actuate the paddle 250 (e.g., pivoting it about the axis of the fulcrum 2053, which in this example is oriented vertically, to release the lock on the swivel mount, without having to reach behind the display.

The detent mechanism 2040 is implemented in this example as a ball detent configured to engage any one of a plurality of detent notches 2041 formed in the surface of the ball 904 of the swivel joint. The detent notches 2041 may be arranged in a regular pattern, e.g., regularly spaced, in one or more rows (or tracks), along the surface of the ball 904. The detent notches 2041 may run in vertical and/or horizontal tracks depending on the desired rotational adjustability to be provided by the swivel mount 2000. Any suitable number of notches 2041, in any desired pattern, may be used based on the on the desired rotational adjustability of the swivel joint. It will be understood that each individual notch 2041 defines a rotational position for the ball 904, and thus the number and pattern of notches 2041 define the plurality of predetermined orientations into which the display may be adjusted. In use, when the second lever end 2054 of the paddle 2050 is actuated (e.g., pivoted toward the display), the first lever end 2052 pivots toward the clamp 2010, pressing the respective post 2035 rearwardly (i.e. away from the plate 2008). This causes the second clamp portion 2014 to displace rearwardly and away from the first clamp portion 2012, reducing the resistance to rotation on the ball 904 applied by the clamp and detent mechanism 2040. After the display is adjusted to a desired orientation by rotating the display and socket relative to the ball, the user releases the paddle(s) to return the second clamp portion and detent mechanism into engagement with the ball 904. As discussed above, the detent mechanism 2040, by virtue of the discrete detent notches in the ball 904, facilitates alignment of the display into any of a plurality of discrete rotational positions defined by the different detent notches.

In some embodiments, the swivel mount is further configured to facilitate switching between landscape and portrait modes of the display (e.g., by rotating the display 90 degrees) in addition to enabling intermediate rotational adjustments of the display in the landscape or portrait modes. Referring to the example in FIGS. 21A and 21B, a swivel mount 2100 is implemented similarly to the swivel mount 2000 and has many of the same features. For example, the swivel mount includes a socket 2210 formed by first and second clamp portions 2212 and 2214, respectively, one of which moves relative to the other in response to actuation of a handle (e.g., paddle(s) 2050). When installed, the plate 2008 is fixed to the rear of the display and remains, along with the first clamp portion, in a fixed relationship therewith. The second clamp portion is actuated away from the first clamp portion by operation of the paddle(s). The socket 2110 includes a slot that extends from the bottom to at least one of its lateral sides 2111. The slot 2131 is defined in part by a first cutout in the first clamp portion 2112 and a second cutout in the second clamp portion 2114, the two cutouts adjoining one another at the interface between the two clamp portions to from the slot 2131 that accommodates the rigid arm 904 when the swivel mount is provided in the portrait orientation. The detent mechanism (or simply detent) 2140 of the swivel mount 2100 is a double-ball detent, which includes a first detent 2140-1 and a second detent 2410-2 spaced apart from one another. The first and second detents 2140-1 are substantially aligned vertically when the display is in landscape orientation, and substantially aligned horizontally when the display is rotated to the portrait orientation. The detent mechanism is supported by the socket and thus as the socket rotates about the ball 904 so does the detent mechanism. Each of the first and second detents 2140-1 and 2410-2 may be implemented by the ball detent mechanism 2040 of the example in FIG. 20B.

Figure 26:
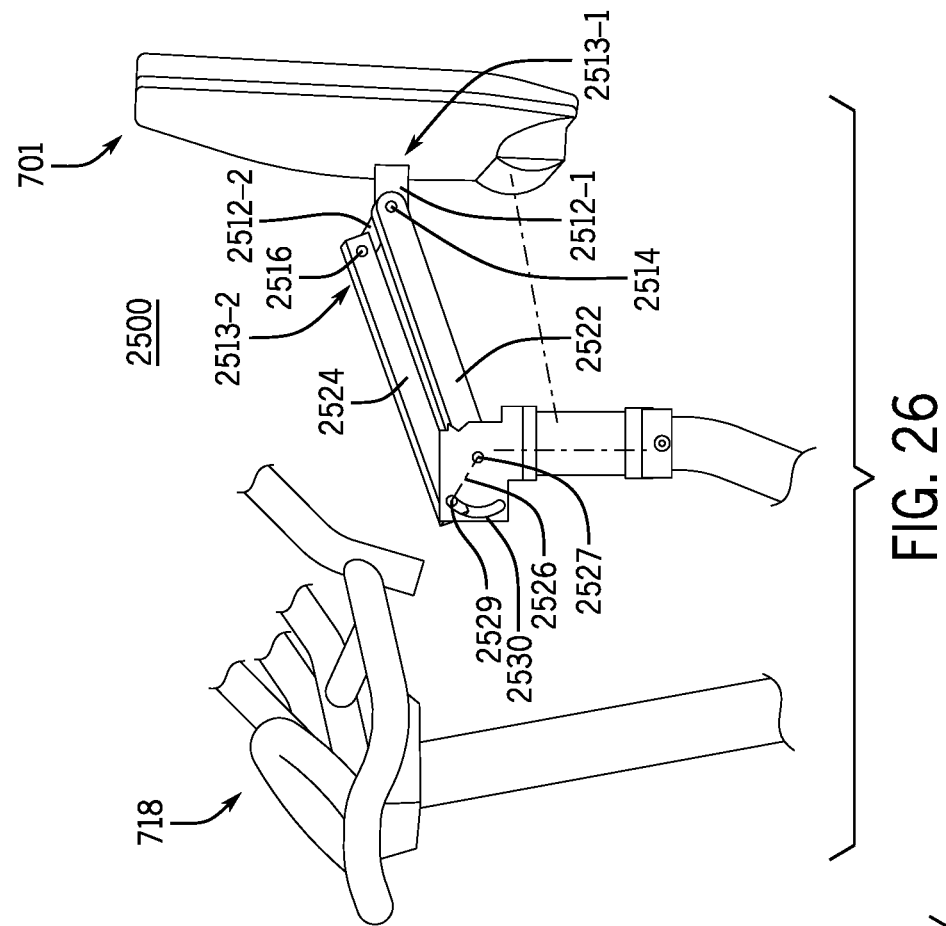
FIGS. 25 and 26 show yet another example of a display mount according to the present disclosure, which enables rotating the display 360 and the selectively positioning of the display in any desired orientation from facing the exercise machine, as in FIG. 25 and facing away from the exercise machine, as in FIG. 26, or any intermediate orientations between the facing toward and facing away positions.
Figure 25:
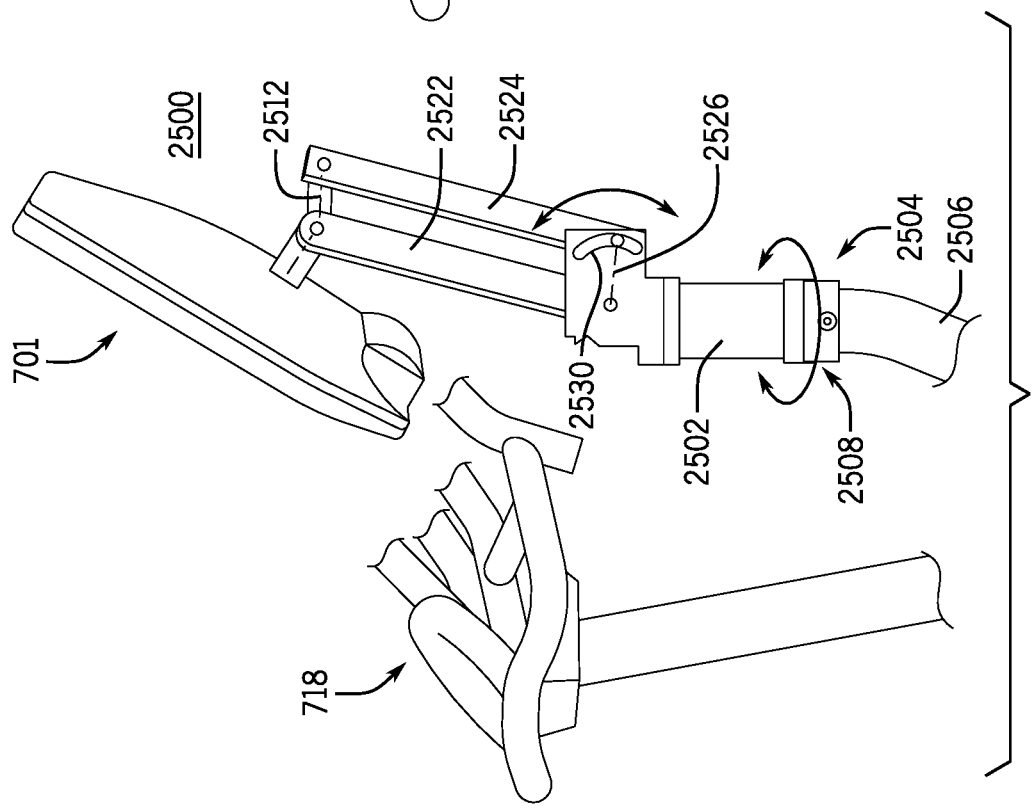

FIGS. 24-26 shows yet another example of a swivel mount 2200 with a double-ball detent. The ball 904 in this example has a multitude of detent notches 2241, which in this example are arrayed over the surface of the ball 904 in a pattern that resembles the dimple pattern of a golf ball. The detent notches 2241 may span substantially the full surface of the ball 904, or at least that portion of the surface that is within the rotational range of the swivel joint. In this example, the detent notches 2241 extend over the entire periphery of the ball 904 which includes the surface of the ball 904 that is within the cavity 923 when the swivel mount is in a nominal (with the screen substantially vertical) landscape position. Similar to the swivel mount 2100, the swivel mount 2200 uses a double-ball detent, which may enable aligning the display more easily to the landscape or portrait orientations. The double ball detent includes a first ball-detent 2240-1 and a second ball-detent 2240-2 spaced apart vertically when the display is in landscape orientation. The ball-detents 2240-1 and 2240-2 are operatively coupled to the second clamp portion 2214, which similar to the preceding example is movably coupled to the first clamp portion 2212. In other examples, the location of the detents may different, such as being coupled to the first clamp portion.

Figure 23A:
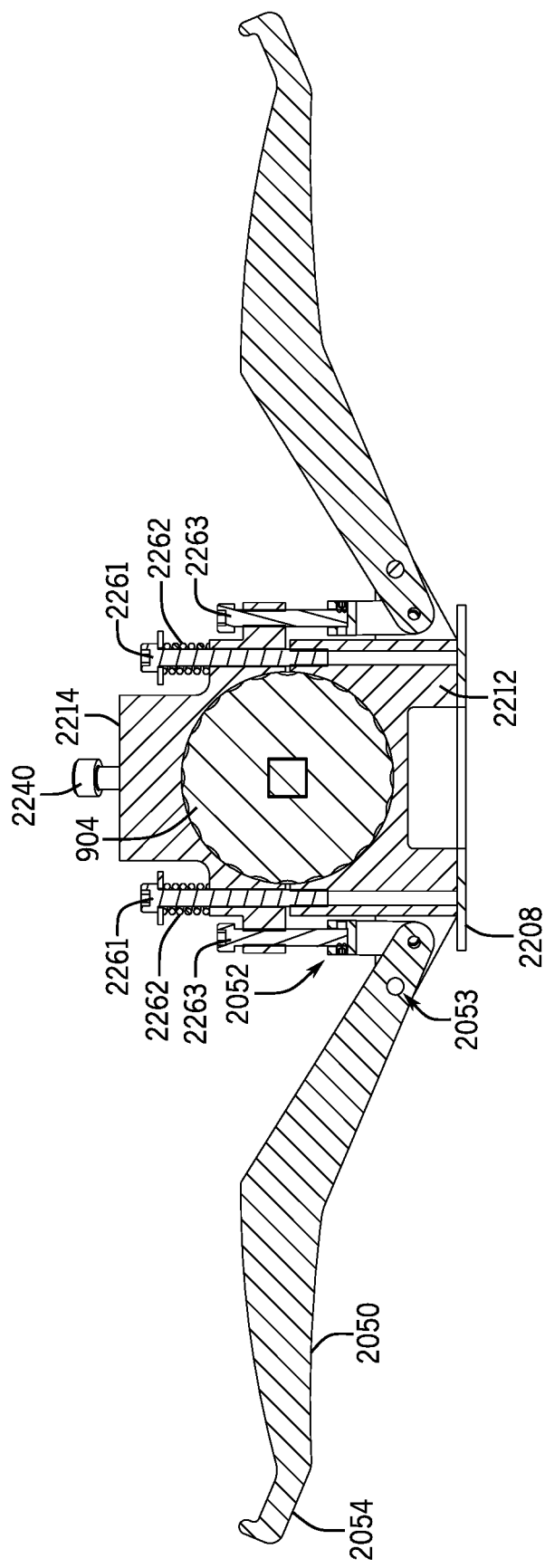
FIGS. 23A and 23B show top section views of display swivel mount in FIG. 22.
Figure 23B:
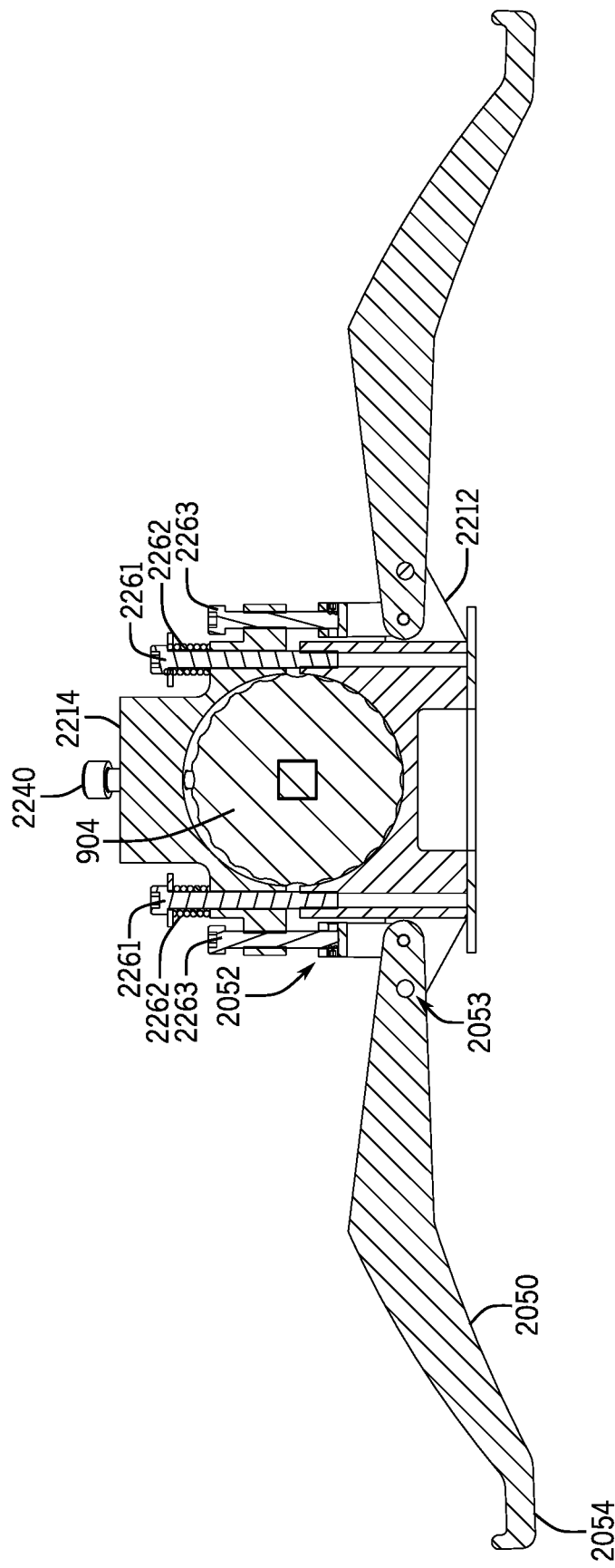

The socket 2210 of the ball and socket joint in this example is similarly implemented by two clamp portions including a first clamp portion 2212, which remains fixed to the display during adjustments, and a second clamp portion 2214 which is movable. In this example, and as can be seen in FIGS. 22 and 23A-23B, the second clamp portion 2214 is movably joined to the first claim portion 2212 via two sets of screws, including a set of first screws 2261, which bias the second clamp portion 2214 toward the first clamp portion 2212, and a set of second screws 2263, which operatively coupled the second clamp portion to the handle (e.g., paddles 2050). Each of the first screws 2261 passes through a corresponding passage of the second clamp portion 2212 and terminates (or is fixed) into the first clamp portion 2212. Each of the first screws 2261 extends beyond the rear side of the second clamp portion 2214, where the screw 2261 is engaged with a respective spring 2262 to apply a biasing force on the second clamp portion 2214 thereby urging the second clamp portion 2214 toward the first clamp portion 2212. The second screws 2263 are fixed to the second clamp portion 2214 so as to move with the second clamp portion 2214 when the rotational resistance mechanism (e.g., clamp) is actuated. The paddle(s) 2050 are operatively coupled to the second clamp portion 2214, via the second screws 2263, for temporarily reducing the force applied by the clamp and thereby allowing the display and socket 2210 to be rotated relative to the ball 904. Each of the second screws 2263 extends from the second clamp portion 2214 and terminates (or is fixed) into a respective link 2052 pivotally coupled to the first lever end of the respective paddle 2050, each of which is pivotally coupled to the first clamp portion 2212 at a respective one of the pivot joints or fulcrums 2053. In the absence of use force on the paddles 2050, the swivel joint is in the locked position shown in FIG. 23A, in which the second lever ends 2054 of the paddles 2050 are pivoted away from the plate 2208 and display and the first lever ends, including the links 2052 are brought closer to the plate 2208 and display. To operate the swivel joint, the user applies manual force on the paddles 2050 pulling the second lever ends 2054 towards the display. This cases the first lever ends, via the connecting links 2052, to push the second screws 2063 and thus the second clamp portion 2214 fixed thereto away from the first clamp portion. The pushing force applied by the paddles 2050 to the second clamp portion 2214 acts against the biasing force of the springs 2262. While holding the paddles 2050 towards the display, the rotational resistance of the socket 2210 relative to the ball 904 is reduced and thus the user can rotate the display to another one of the predetermined (by the notches) rotational positions. Once rotated to the desired position, the user released the paddles 2050 and the rotational resistance mechanism (e.g., the clamp) reengaged the ball 904, with the detents 2240 helping to align (e.g., clicking or snapping) the display into one of the predetermined rotational positions.

FIGS. 25 and 26 show another example of a rotatable display mount assembly 2500 which enables the display's orientation and elevation to be changed. The rotatable display mount assembly 2500 is implemented by a combination of a four-bar linkage and a rotatable joint. A rigid arm 2505 (or interchangeably display post 2502) is rotatably coupled to the terminal end 2504 of the frame member 2506 of an exercise machine (e.g., mast 722 of the exercise bike 700, only the handle bar 718 of which is shown in FIGS. 25-26). The display post 2502 may be implemented, in part, by a substantially solid body or by at least partially hollow rigid structure (e.g., a tube of any suitable cross-sectional geometry). In some embodiments, the rotatable coupling 2508 between the lower end of the post 2502 and the and the terminal end 2504 of frame member 2506 is a single-axis rotational joint (e.g., a shaft and bearing combination) that allows the post 2502 to rotate about its axis but otherwise restricts all other degrees of freedom of the post 2502. In such embodiments, a bushing with friction, connected to either the post 2502 or the frame member 2506, may be used to rotatably couple the display mount assembly 2500 to the frame of the exercise machine. In other embodiments, the rotatable coupling 2508 may be a swivel joint that allows the post 2502 to swivel (e.g., in a conical range of motion) relative to the terminal end 2504 of the frame member 2506. Any suitable swivel joint that provides rotational resistance may be used, such as any of the ball-and socket joints described herein.

A four bar linkage 2510 is operatively associated with the upper end of the display post 2502. A first end of a main link 2512 is mounted (e.g., rigidly) to the display 701. The main link 2512 may be implemented as an angled rigid member, which has a first segment 2512-1 extending form the first end 2513-1 of the main link to a first main link pivot 2514, and a second segment 2512-2 which is at a fixed angled to the first segment 2512-1 and extends from the first main link pivot 2514 to a second end 2513-2 of the main link 2512. A second main link pivot 2515 is provided at the second end 2513-1 of the main link 2512.

Each of a pair of supporting links 2522 and 2524 are pivotally connected to the post 2502 at a respective one of the first and second main link pivots 2514 and 2515. That is, a first supporting link 2522, which may be implemented by an elongate rigid member, is pivotally connected, at one of its ends, to the first main link pivot 2514. The second supporting link 2524, which may similarly be implemented by an elongate rigid member, is pivotally connected, at one end, to the second main link pivot 2515. The opposite ends of each of the first and second supporting links 2522 and 2524 are pivotally connected to the display post 2502, at two spaced apart locations A and B that define the fourth (or base) link 2526. More specifically, the first supporting link 2522 is pivotally connected to the post 2502 at a first pivot location A, forming the first base pivot 2527. The second supporting link 2526 is pivotally connected to the post 2502 at a second pivot location B, forming the second base pivot 2529. The second pivot location B is movable in a concentric arc relative to the first pivot location A, and the second base pivot 2529 may, thus, be interchangeably referred to as a concentric pivot. The movement of the second pivot location B is constrained by a concentric arcuate slot 2530 formed in the post 2502. Each of the pivots (e.g., main link pivots 2514 and 2516, and base pivots 2517 and 2519) may be provided by a pin joint. In the case of the concentric pivot, the pin of the joint is operatively associated with the arcuate slot 2530 such that it can slide along the slot when the four-bar linkage is moving.

The four-bar linkage 2510 in this example includes the four links (i.e. main link 2512, the two supporting links 2522 and 2524, and the base link 2526 provided by the upper end of the post), which are operatively joined to one another such that they move about the pivot location A when adjusting the position of the display. To adjust the position of the display, the display mount assembly is rotated, at the rotatable joint 2504 from a first orientation (e.g., a machine-facing orientation in which the display faces the exercise machine, as shown in FIG. 25) to a second orientation (e.g., an outwardly-facing orientation in which the display faces away from the machine, as shown in FIG. 26, or to any other intermediate orientation between the two illustrated orientations). The display's elevation may be adjusted (e.g., raised or lowered) by movement of the four-bar linkage. Resistance to movement of the four-bar linkage may be provided by using rotational resistance at one of the pivots of the four-bar linkage (e.g., using a friction bushing at the first base pivot 2527 or any of the other pivots). The term link as used in the context of describing this or other linkages in this disclosure, refers to any suitable rigid member that can act as a rigid link.

Using the combination of a rotatable (or, in some embodiments, swivelable) arm or post 2502 with a four-bar linkage 2505 coupling the upper end of the post to the rear side of the display, particularly a four-bar linkage that has four movable links fixed to the frame only one of the pivot points, may advantageously provide a larger range of adjustability for the position and orientation of the display. The combination of structural elements in this example may also provide a greater offset of the display from the exercise machine, such as when positioned in a facing-away position e.g., for use off the exercise machine, which can be advantageous in that the user is able to stand further (e.g., a safer or more practical distance away from the machine) while still being able to comfortably observe the display.

Inventive combinations are further disclosed in the below enumerated paragraphs:

A1. A display mount assembly of an exercise machine having a base that supports the exercise machine in a stationary position relative to a support surface, the display mount assembly comprising:
  a frame member extending above the base of the exercise machine;
  a cavity in an upper terminal end of the frame member;
  a rigid arm rotatably received in the cavity, wherein the rigid arm is configured to be rigidly coupled, at its first end, to a rear side of a display such that the display remains in a fixed position in relation to the rigid arm when coupled to the rigid arm, and wherein the rigid arm comprises a ball at its second end, the ball being rotatably received in the cavity; and
  a retention member operatively associated with the upper terminal end and positioned across the cavity to substantially prevent movement of the ball along a length of the frame member while allowing the ball to rotate in multiple directions in the cavity.

A2. The display mount assembly of paragraph A1, wherein the retention member comprises a block positioned across a top side of the cavity and fastened to the frame member to retain the ball therein.

A3. The display mount assembly of paragraph A1, wherein the retention member comprises a cap threaded coupled to the terminal end of the frame member.

A4. The display mount assembly of paragraph A1 or A2, wherein the retention member defines a through aperture that accommodates the rigid arm therethrough, wherein the aperture has a diameter smaller than a diameter of the ball and greater than a diameter of the second end of the rigid arm.

A5. The display mount assembly of paragraph A1, wherein the retention member is positioned below the ball and defines a base of the cavity.

A6. The display mount assembly of paragraph A5, wherein the terminal end of the frame member comprises a tube defining an interior passage, wherein the retention member comprises a pin extending through a thickness of the tube and a wedge fixed to an end of the pin located in the interior passage.

A7. The display mount assembly of any paragraphs A1-A6, wherein the rigid arm comprises a curved portion.

B1. An exercise machine comprising:
  a display enclosed at least partially by a housing;
  a frame including a base that supports the exercise machine in a stationary position relative to a support surface and a frame member extending above the base; and
  a display mount according to any of the embodiments of the present disclosure rotatably coupling the housing to the frame member.

B2. The exercise machine of paragraph B1 wherein the display mount comprises a rigid arm having a first end and a second end, wherein the first end is fixed to the housing and wherein the second end is rotatably coupled to a terminal end of the frame member to form a ball joint therewith, whereby the display is repositionable relative to the frame member in response to rotation of the ball joint while the display remains in a fixed position relative to the rigid arm.

B3. The exercise machine of paragraph B2, wherein the rigid arm comprises a ball at the second end and wherein the terminal end of the frame member defines a cavity sized to accommodate the ball at least partially therein.

B4. The exercise machine of paragraph B3, wherein a depth of the cavity is smaller than a diameter of the ball.

B5. The exercise machine of paragraph B3, wherein a depth of the cavity is equal to or greater than a diameter of the ball.

B6. The exercise machine of paragraph B1, wherein the ball is substantially prevented from moving along a length of the frame member at least in part by a retention member operatively coupled to the terminal end.

B7. The exercise machine of paragraph B6, wherein the retention member is positioned over the ball.

B8. The exercise machine of paragraph B7, wherein the retention member defines an aperture having a diameter smaller than a diameter of the ball and larger than a width of the rigid arm at the second end, and wherein the rigid arm passes through and is freely movably within the aperture.

B9. The exercise machine of paragraph B6, wherein the retention member is threadedly coupled to the terminal end.

B10. The exercise machine of paragraph B6, wherein the retention member is positioned under the ball.

B11. The exercise machine of paragraph B6, wherein the retention member comprises a wedge configured to engage the ball and resist rotation of the ball in the cavity.

All relative and directional references (including: upper, lower, upward, downward, left, right, leftward, rightward, top, bottom, side, above, below, front, middle, back, vertical, horizontal, and so forth) are given by way of example to aid the reader's understanding of the particular embodiments described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A display mount assembly of an exercise machine having a display and a base that supports the exercise machine in a stationary position relative to a support surface, the display mount assembly comprising:
  a frame member extending above the base of the exercise machine;
  a rigid arm having a first end and a second end, wherein a ball is fixed to the rigid arm at one of the first and second ends of the rigid arm, wherein the other one of the first and second ends of the rigid arm is fixed to one of a terminal end of the frame member or to a rear side of the display, wherein the other one of the terminal end of the frame member or the rear side of the display defines a socket configured to rotatably receive the ball;

a rotational resistance mechanism operatively associated with the socket to selectively, responsive to manipulation by the user from an unlocked position to a locked position, resist the relative rotation of the ball in the socket; and a spring operatively associated with the resistance mechanism to bias the resistance mechanism to the locked position.

2. The display mount assembly of claim 1, wherein the rigid arm is fixed to the display and the socket is defined by the terminal end of the frame member.

3. The display mount assembly of claim 2, wherein the terminal end of the frame member is a tube, and wherein the socket is provided, at least in part, by a first member received in the tube such that it is positioned under the ball, and a second member received in the tube an positioned over the ball.

4. The display mount assembly of claim 3, wherein at least one of the first and second members is movable relative to the other one of the first and second members.

5. The display mount assembly of claim 4, wherein the first member is fixed to a screw cap threadedly coupled to the terminal end via a screw cap.

6. The display mount assembly of claim 4, wherein the second member is fixed to a plate within the tube, the display mount assembly further comprising an actuator configured to move the second member and plate along a length of the tube.

7. The display mount assembly of claim 3, wherein the first member has a conical aperture extending through a thickness of the first member to a side of the first member facing the second member.

8. The display mount assembly of claim 3, wherein at least one of the first and second members comprises a resilient pad.

9. The display mount assembly of claim 3, further comprising a third member arranged to contact a side of the ball between the first and second members.

10. The display mount assembly of claim 2, wherein the socket is provided by a clamp having a first clamp portion fixed to the terminal end of the frame member and a second clamp portion movably coupled to the first clamp portion, wherein opposing faces of the first and second clamp portions each include a concave cavity, and wherein the concave cavities of the first and second clamp portions together define a substantially spherical cavity configured to receive the ball at least partially therein.

11. The display mount assembly of claim 10, wherein the opposing face of at least one of the first and second clamp portions comprises resilient material.

12. The display mount assembly of claim 1, wherein the rigid arm is fixed to the frame member and the socket is fixed to the display.

13. The display mount assembly of claim 1, wherein the socket is provided by a clamp having a first clamp portion fixed to one of the terminal end of the frame member and the display and a second clamp portion movably coupled to the first clamp portion, wherein opposing faces of the first and second clamp portions together define a substantially spherical cavity configured to receive the ball at least partially therein.

14. The display mount assembly of claim 13, further comprising a handle configured to actuate the second clamp portion away from the first clamp portion.

15. The display mount assembly of claim 14, wherein the handle comprises a rod passing through the first clamp portion and terminating in the second clamp portion.

16. The display mount assembly of claim 14, wherein the handle comprises a pair of paddles, having a first end positioned to engage an opposite side of the second clamp portion and having a second end extending to an opposite side of the display.

17. The display mount assembly of claim 16, further comprising at least one detent mechanism operatively engaged with the clamp and the ball to urge the ball toward one of a plurality of predetermined rotational positions.

18. The display mount assembly of claim 17, wherein the detent mechanism comprises at least one ball-detent and wherein the ball comprises a plurality of notches, each configured to operative engagement with the at least one ball-detent.

19. The display mount assembly of claim 18, wherein the detent mechanism comprises two ball-detents coupled to the second clamp portion at two spaced apart locations, each of the two ball-detents configured for operative engagement with the plurality of notches.

20. The display mount assembly of claim 16, wherein the clamp is configured to enable positioning of the display in landscape orientation and portrait orientation.

21. The display mount assembly of claim 20, wherein the first and second clamp portions together define a slot extending to a lateral face of the clamp, the slot sized to accommodate the rigid arm therein.

22. A stationary exercise machine comprising the display mount assembly of claim 1, the exercise machine comprising:
 a plurality of movable components configured to be driven by user force,
 a frame supporting the plurality of movable components onto a support surface, and
 a display rotatably mounted to the frame.

23. The exercise machine of claim 22, wherein plurality of movable components comprise a wheel rotated by a pair of cranks operatively coupled to opposite sides of the wheel, and wherein the frame member is a mast extending from the base of an exercise machine.

24. The display mount assembly of claim 1, further comprising a linkage operatively associated with the resistance mechanism to move the resistance mechanism between the locked and unlocked positions.

25. A display mount assembly of an exercise machine having a display, the display mount assembly comprising:
 a frame member;
 a rigid arm having a first end and a second end, wherein a ball is fixed to the rigid arm at one of the first and second ends of the rigid arm, wherein the other one of the first and second ends of the rigid arm is fixed to one of a terminal end of the frame member or to a rear side of the display, wherein the other one of the terminal end of the frame member or the rear side of the display defines a socket configured to rotatably receive the ball;
 a resistance mechanism operatively associated with the socket to selectively, responsive to manipulation by the user from an unlocked position to a locked position, resist a relative rotation of the ball in the socket; and
 a linkage operatively associated with the resistance mechanism to move the resistance mechanism between the locked and unlocked positions.

26. The display mount assembly of claim 25, further comprising a spring operatively associated with the resistance mechanism to bias the resistance mechanism to the locked position.

\* \* \* \* \*